United States Patent [19]

van der Lely

[11] 4,304,313

[45] Dec. 8, 1981

[54] TRACTOR

[76] Inventor: Cornelis van der Lely, 7, Brüschenrain, Zug, Switzerland

[21] Appl. No.: 115,232

[22] Filed: Jan. 25, 1980

Related U.S. Application Data

[63] Continuation of Ser. No. 840,046, Oct. 6, 1977, abandoned.

[30] Foreign Application Priority Data

Oct. 8, 1976 [NL] Netherlands .......................... 7611134
Jan. 6, 1977 [NL] Netherlands .......................... 7700073

[51] Int. Cl.³ .............................................. B62D 55/02
[52] U.S. Cl. ..................................... 180/9.36; 180/15;
180/24.05; 180/24.11; 192/86
[58] Field of Search .................. 180/9.2 C, 9.26, 9.28,
180/9.3, 9.34, 9.36, 9.5, 15, 16, 24.05, 24.11,
24.12, 24.13; 192/86

[56] References Cited

U.S. PATENT DOCUMENTS

| | | | |
|---|---|---|---|
| 1,279,070 | 9/1918 | Zimmerman | 180/16 |
| 1,285,343 | 11/1918 | Olson | 180/16 |
| 1,355,853 | 10/1920 | Habsburg-Lothringer | 180/15 |
| 1,411,523 | 4/1922 | Schlueter | 180/9.26 |
| 1,712,155 | 5/1929 | Mistral | 180/15 |
| 1,769,074 | 7/1930 | Ruatti | 180/15 |
| 2,173,793 | 9/1939 | Doblhoff | 180/9.3 |
| 2,173,794 | 9/1939 | Radiis | 180/9.3 |
| 2,195,432 | 4/1940 | Short | 180/24.12 |
| 2,554,785 | 5/1951 | Letiter | 180/24.05 |
| 2,633,218 | 3/1953 | Pielstick | 192/86 |
| 2,818,139 | 12/1957 | Sutter | 180/15 |
| 2,850,122 | 9/1958 | Alishouse | 192/86 |
| 3,095,938 | 7/1963 | Bertelsen | 180/9.5 |
| 3,153,908 | 10/1964 | Lawrence | 180/307 |
| 3,362,493 | 1/1968 | Davis | 180/6.3 |
| 3,672,167 | 6/1972 | Griesenbrock | 180/307 |

FOREIGN PATENT DOCUMENTS

| | | | |
|---|---|---|---|
| 733663 | 3/1943 | Fed. Rep. of Germany | 301/36 A |
| 192271 | 10/1937 | Switzerland | 180/9.28 |
| 121530 | 12/1918 | United Kingdom | 180/16 |

*Primary Examiner*—John P. Silverstrim
*Attorney, Agent, or Firm*—Penrose, Lucas, Albright, Mason, Mason and Albright

[57] ABSTRACT

An agricultural type tractor with lifting devices on the front, rear and both sides for agricultural implements. Each pair of rear drivable wheels which are in tandem pivot about a common axle and each pivotable pair of such wheels is driven by a separate hydraulic motor, with each motor, however, connected to a common control whereby the velocity of the wheels on one side can be increased while the velocity of those on the other is decreased for steering around curves and the like. The arrangement also provides a hydraulically lockable differential to avoid the spinning of one set of the drivable wheels while the other set does not move due to an obstruction or the like. Outboard of each set of drivable wheels is a rotatable supporting element which is mounted from the tractor's frame so as to be displaceable outwardly and upwardly relative to the adjacent 0010 set of drivable wheels. Each supporting element has two wheel members which receive an endless chain tread. One of the wheel members on each side has a displaceable hub portion which is connectable to the adjacent drivable wheel. Such a connection can also be accomplished by displacing the wheel members and arrangements are disclosed whereby through the levers, eccentrics and/or chains the pair of wheel members may be displaced first substantially outwardly relative to the adjacent drivable wheels and then upwardly and vice versa.

49 Claims, 20 Drawing Figures

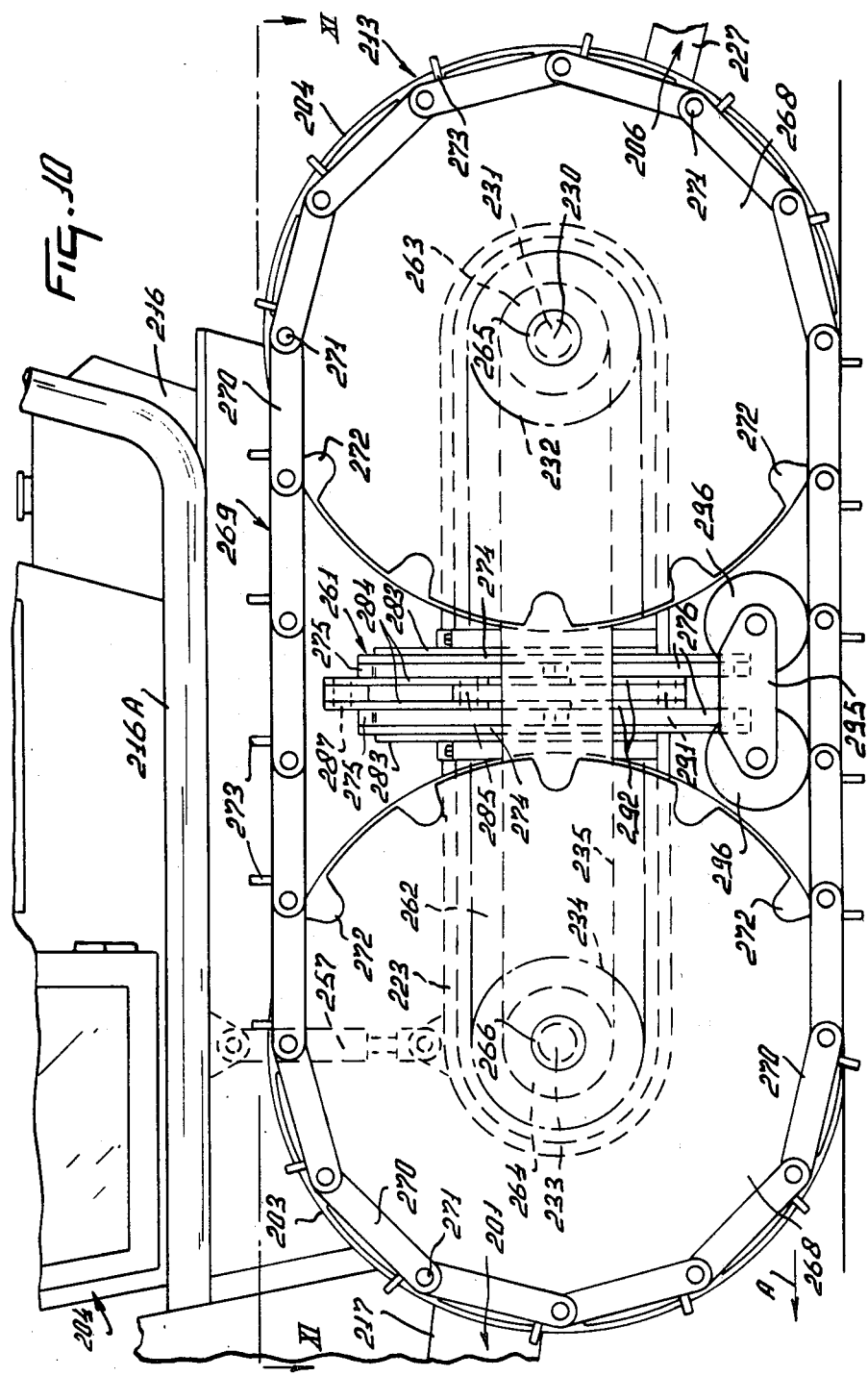

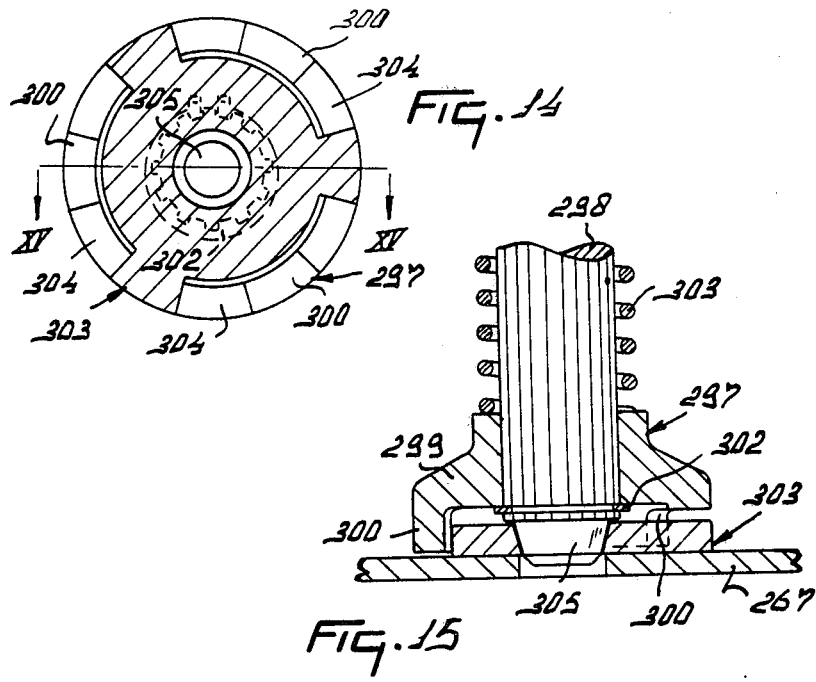
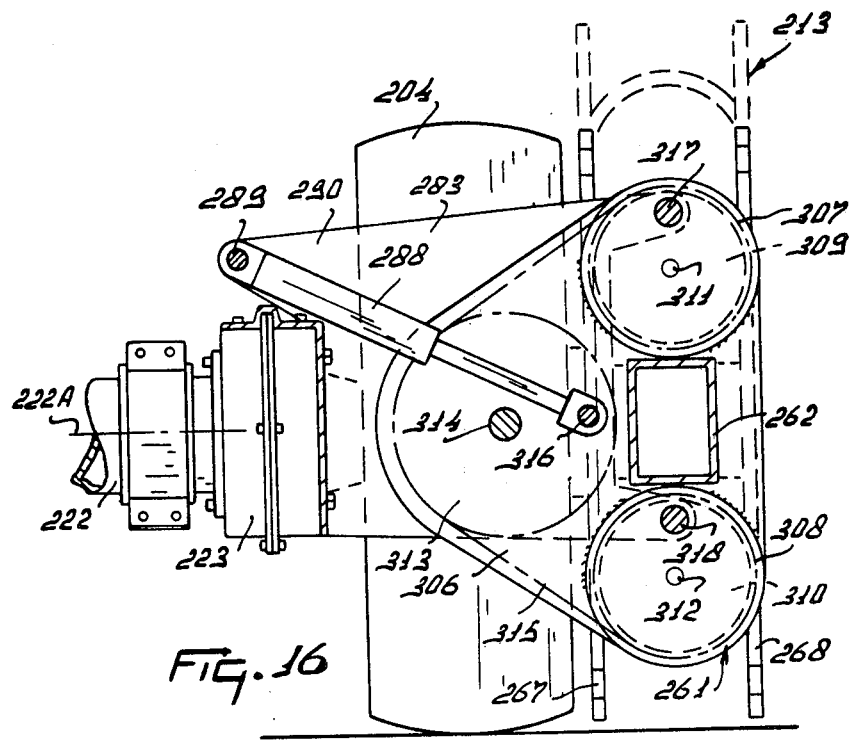

TRACTOR

RELATED APPLICATION

This is a continuation of Ser. No. 840,046 filed Oct. 6, 1977 now abandoned.

SUMMARY OF THE INVENTION

The invention relates to a tractor particularly, although not necessarily exclusively, for agricultural purposes.

According to a first aspect of the present invention there is provided a tractor comprising at least one drivable wheel and at least one supporting element which is rotatable ground engagable member, there being provided coupling means for drivingly connecting the supporting element to the wheel, said coupling means being displaceable substantially parallel to the wheel axle.

According to a second aspect of the present invention there is provided a tractor comprising drivable wheels, wherein at least one of the wheels has a hub portion which is rotatable and is accommodated at least partly in a non-rotatable hub portion of that wheel the non-rotatable hub portion being firmly connected, at least during operation, with a frame part of the tractor.

According to a third aspect of the present invention there is provided a tractor or a similar vehicle having a drivable supporting element which is pivotally arranged on one side of the tractor and which is laterally movable into and out of driving engagement with an engine of the tractor.

According to a fourth aspect of the present invention there is provided a tractor or a similar vehicle having drive means which is provided on each side of the tractor with a hydraulic control device for counteracting undesirable skidding on the respective side.

For a better understanding of this invention and to show how the same may be carried into effect, reference will be made by way of example to the accompanying drawing.

BRIEF DESCRIPTION OF THE DRAWINGS

FIG. 10 is an enlarged side elevation of part of the tractor shown in FIG. 8;

FIG. 14 is a sectional view taken on the line XIV—XIV in FIG. 11;

FIG. 15 is a sectional view taken on the line XV—XV in FIG. 14;

FIG. 16 shows a second embodiment of the construction shown in FIG. 12;

PREFERRED EMBODIMENTS OF THE INVENTION

Figure 1:
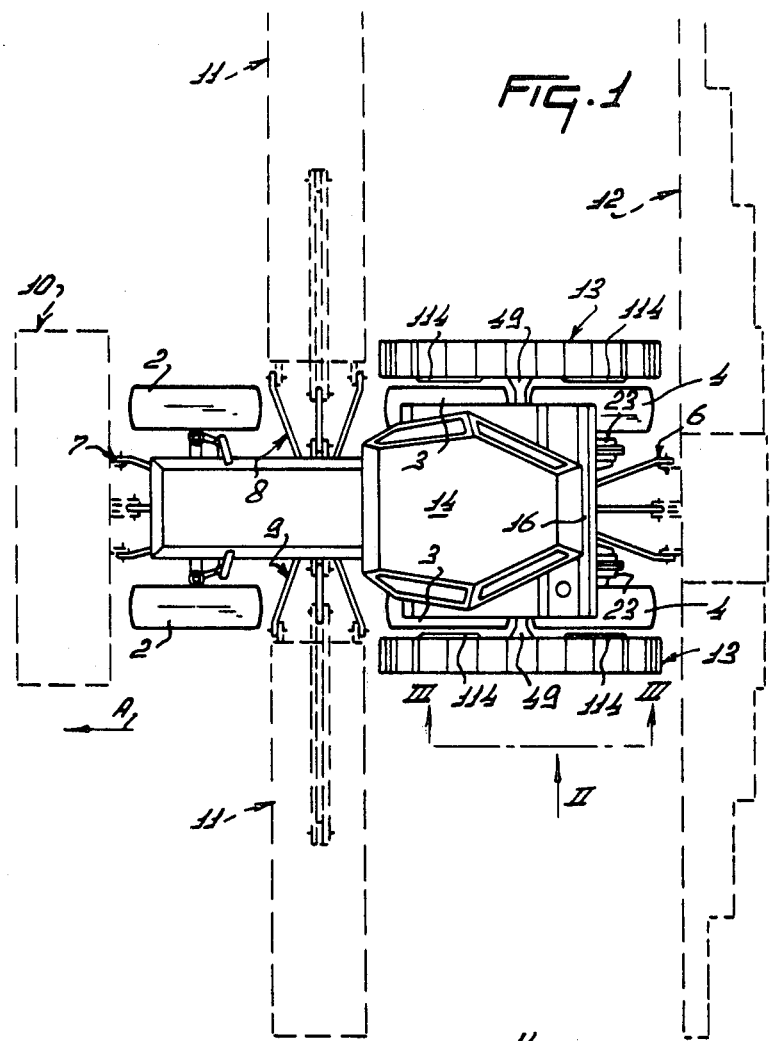
FIG. 1 is a plan view of one embodiment of a tractor.
Figure 2:
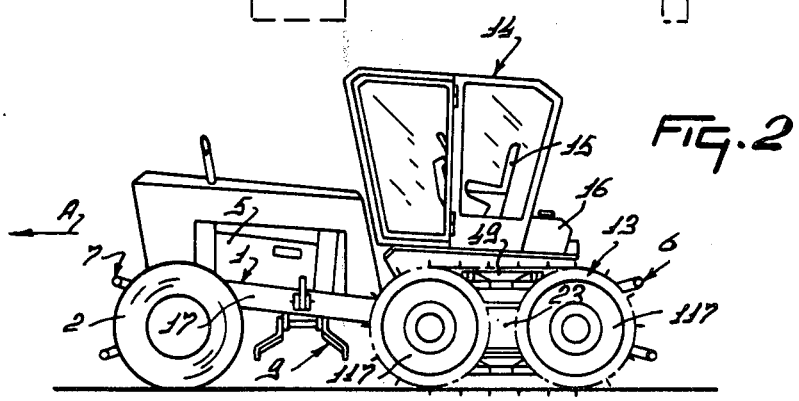
FIG. 2 is an elevational view taken in the direction of the arrow II in FIG. 1.

The tractor shown in FIGS. 1 and 2 comprises a frame 1 supported by a pair of steerable front wheels 2 and two pairs of rear wheels 3 and 4, which can be driven as will be described more fully later in this description. The front wheels 2 may also be drivable. The frame 1 holds a combustion engine 5 for driving the rear wheels 3 and 4 and, as shown in the side elevation of FIG. 2, it is located between the front wheels 2 and the leading pair of rear wheels 3. The tractor frame is provided towards the rear with a hydraulically actuable three-point lifting device 6, and at the front the tractor has a further three-point lifting device 7. Between the front wheels 2 and the leading pair of rear wheels 3 the frame is provided with two hydraulically actuable three-point lifting devices 8 and 9, which are symmetrically arranged on either side of the vertical, longitudinal plane of symmetry of the tractor and which extend transversely of the direction of travel which is indicated in some of the Figures by an arrow A. It is thus possible to attach to the lifting devices 7, 8 and 9 implements 10 and 11 such as rotary harrows or seed drills, whose working widths overlap one another, viewed in the direction of travel A. At the same time the lifting device 6 may be provided with, for example, a fertilizer distributor 12, the working width of which corresponds with that of the implements 10 and 11. The dimensions of the three-point lifting devices 8 and 9, measured transversely of the direction of movement A, are such that their extreme ends do not project beyond the other parts of the tractor. Near the two rear wheels 3 and 4 on each side of the tractor is provided a further supporting element 13, which comprises a track in the form of an endless track laying chain 121 and has a size such that the length of the structure 13 measured in the direction of travel A approximately corresponds to the distance between the front side of the wheel 3 and the rear side of the wheel 4, while the element 13, viewed from a side, substantially covers the two associated wheels 3 and 4. The supporting element 13 with the endless tread chain 121 is located on both sides of the tractor outboard of the associated wheels 3 and 4.

The tractor comprises furthermore a driver's cab 14 having a driver's seat 15. This cab is arranged symmetrically to the vertical longitudinal plane of symmetry of the tractor in a position such that viewed from the side the seat 15 (FIG. 2) is located above the region between the pairs of rear wheels 3 and 4. Behind the cab 14 is located a fuel tank 16 which lies above the front half of the rear wheels 4 and which, viewed in a transverse direction and on plan, is located entirely between the vertical planes of symmetry of the two back-wheels 4 arranged one on each side of the tractor. The floor of the cab 14 and the bottom side of the tank 16 are located, viewed from the side, above the highest points of the wheels 4 and of the track laying chain 121 of the element 13.

Figure 4:
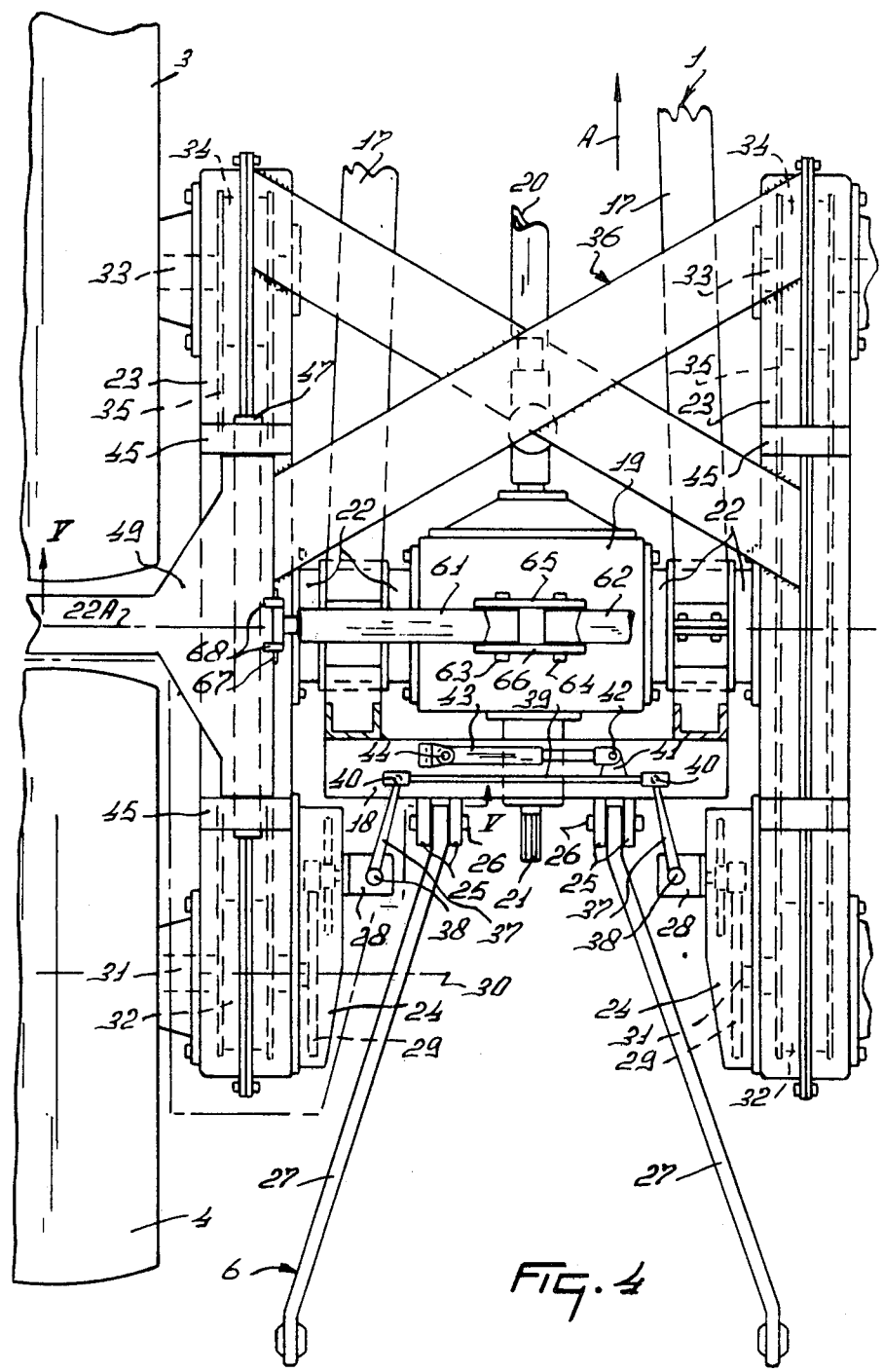
FIG. 4 is a partly sectional plan view taken on the lines IV—IV in FIG. 3.

FIG. 4 shows frame beams 17 of the frame 1 which are disposed symmetrically to the vertical, longitudinal plane of symmetry of the tractor. These beams 17 are constructed in the form of torsion-resistant hollow beams due, among other reasons, to the presence of the lateral lifting devices 8 and 9. The two frame beams 17 are interconnected near their rear ends and at the level of the rear wheels 4 by a transverse girder 18 and carry a hydraulic pump 19 located in front of the transverse girder 18, viewed in the direction of travel A, which pump can be driven by means of an auxiliary shaft 20, which can be directly driven by the engine 5. The hydraulic pump 19 has an output shaft 21 extending to the rear, which is adapted to be driven directly by the shaft 20 with constant speed, this shaft 21 serving as a power take-off shaft. The hydraulic pump 19 is rigidly secured to two carriers 22 extending transversely of the direction of travel, by means of which the pump is pivotally connected with the frame beams 17 with the aid of a pivotal shaft 22A, which coincides with the registering center lines of the cylindrical carriers 22. These carriers are each pivotally journalled in a bushing fastened to the respective beam 17. The carriers 22 project outwardly to each side of the respective beam 17. To the two outermost ends of the carriers 22 are rigidly secured housings 23 of transmission mechanisms, which housings are thus also pivotable with respect to the frame 1. Near the rear of each housing 23 and on its inner side, a housing 24 of a gear wheel transmission is provided with its front side located just behind the rear side of the transverse girder 18. On the rear side of the transverse girder 18 two pairs of tags 25 are vertically disposed at a distance from and symmetrical to the vertical longitudinal plane of symmetry of the tractor. The two pairs of tags 25 each hold a pivotal shaft 26, the center lines of the two pivotal shafts 26 being in line with one another. Between the two tags 25 of each pair is arranged the front end of a lower arm 27 of the three-point lifting device 6, the two arms being pivotable about the associated pivotal axis 26 extending substantially horizontally and transversely of the direction of travel A (FIG. 4).

Since the construction is symmetrical with respect to the vertical longitudinal plane of symmetry of the tractor, a description of the structure located on one side of that plane will be given.

Near the front end and at the inner side of each housing 24 a hydraulic motor 28 is provided which can be driven by means of the hydraulic pump 19. The hydraulic motor 28 has an output shaft which extends substantially horizontally and transversely of the direction of travel A and which projects into the neighboring housing 24. This output shaft of the motor 28 drives reduction gearing 29, which is accommodated in the housing 24 and which also has an output shaft extending substantially horizontally and transversely of the direction of travel A and projecting into the housing near its rear. The center line of this output shaft is designated in FIG. 4 by reference numeral 30; this shaft is directly coupled with a wheel axle 31 journalled in the housing 23 and holding at its end projecting from the outer side of the housing 23 one of the rear wheels 4. The portion of the wheel axle 31 located inside the housing 23 holds a chain sprocket 32, which can also be driven through the reduction gearing 29 by the hydraulic motor 28. Viewed from the side, the chain sprocket 32 is located behind the rear of the transverse girder 18 and therefore at a distance behind the pivotal axis 22A. Viewed from the same side the housing 23 has a symmetrical shape about the pivotal axis 22A and it holds also a wheel axle 33, the center line of which is parallel to that of the wheel axle 31, the centerlines of the wheel axles 31 and 33 being equidistant from the pivotal shaft 22A. The wheel axle 33 is also provided with a chain sprocket 34 which is located in the housing 23 and is identical in shape and size to the chain sprocket 32. A driving chain 35 is passed around the two chain sprockets 32 and 34, by means of which the corresponding rear wheel 3 can also be driven by the hydraulic motor 28. Consequently the assembly of the two drivable wheels 3 and 4 on each side is pivotable with respect to the frame 1 about the pivotal shaft 22A. The top sides as well as the bottom sides of the two housings 23 are interconnected by two X-shaped stiffening elements 36 of sheet strips, welded together and to the two housings 23. The two stiffening elements 36 may also serve as stops to limit the pivotal movement of the housings 23 about the pivotal shafts 22A by abutment of the elements 36 against the frame beams 17. Between the elements 36 and the frame beam 17 can be arranged bump stops, for example of rubber. The construction may, however, also be such that in the absence of the elements 36 the two housings 23 pivot independently of one another about their corresponding pivotal shafts 22A, so that the housings 23 and hence the sets of wheels 3, 4 on each side of the tractor are capable of turning relatively to one another. For this purpose the two housings 23 may each be provided with a stub shaft (not shown), which is freely pivotable in the associated carrier 22.

The two hydraulic motors 28 can be controlled in common. For this purpose each motor 28 has a control arm 37, which is pivotable with respect to the housing of the associated motor 28 about a substantially vertical pivotal shaft 38, which is rigidly secured to the associated arm 37 and by which the rate of flow of fluid to the motor 28 can be adjusted. The two control arms 37 are intercoupled by a coupling rod 39. The arms 37 are fastened to the rod 39 by means of ball joints 40. The arms 37 may each be constructed in the form of telescopic rods. The coupling rod 39 is provided with a lug 41, in which a substantially vertical pivotal shaft 42 is journalled. A hydraulic cylinder 43 is secured at one end to the transverse girder 18 by means of a substantially vertical pivotal shaft 44. The hydraulic cylinder 43 contains a piston to which is connected a piston rod which is pivotable about the pivotal shaft 42 and connected with the lug 41. The center line of the hydraulic cylinder 43 extends substantially horizontally and transversely of the direction of travel A. The hydraulic cylinder 43 has two hydraulic conduits communicating with the spaces on either side of the piston. The inlet and outlet of hydraulic fluid for the cylinder 43 through said conduits can be controlled by the tractor driver from the cab 14.

Figure 3:
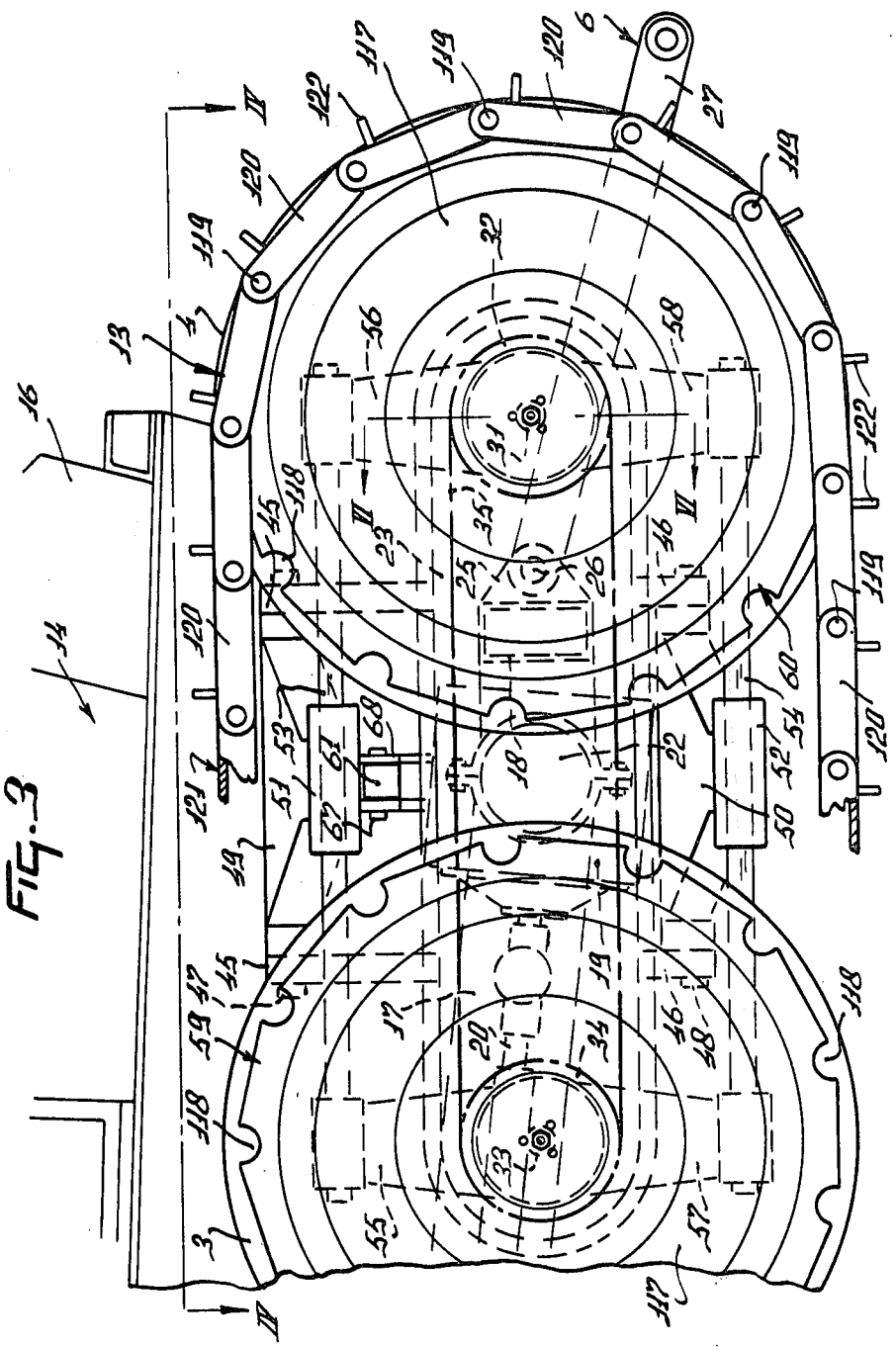
FIG. 3 shows on an enlarged scale part of the elevational view of FIG. 2 taken in the direction of the arrows III—III in FIG. 1.
Figure 5:
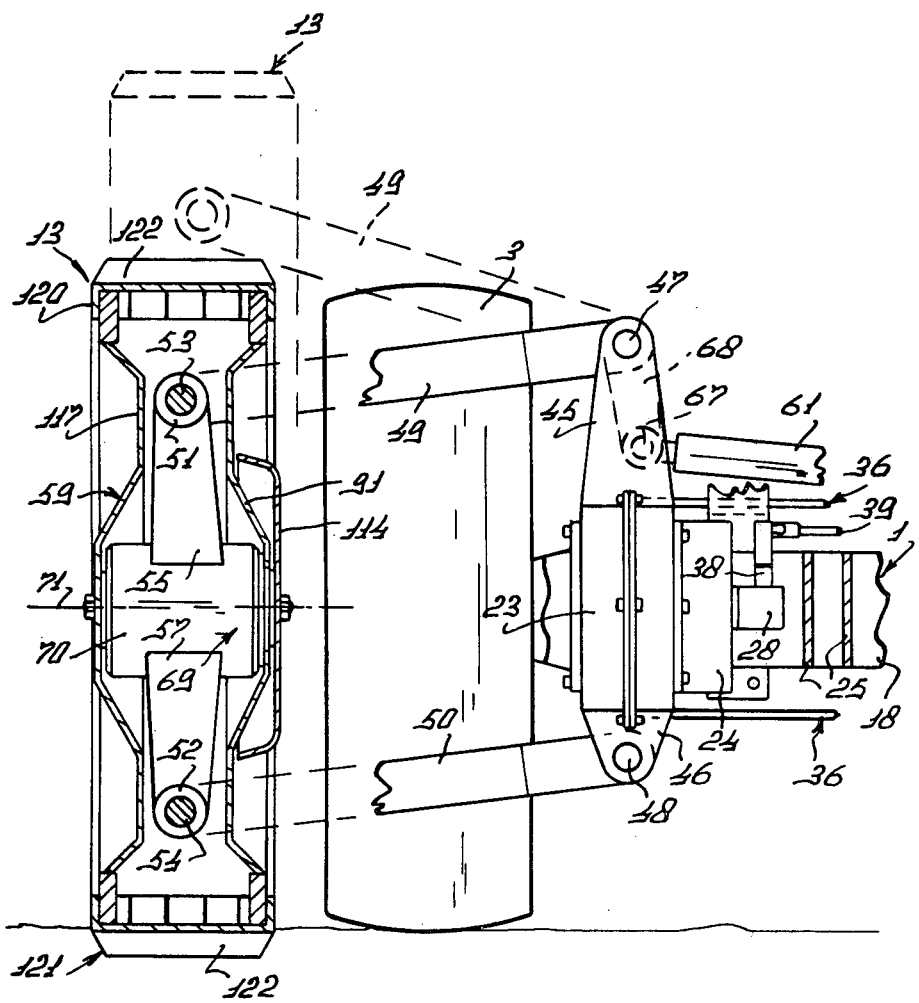
FIG. 5 is a partly sectioned elevational view taken on the lines V—V in FIG. 4.

To the top sides and to the bottom sides of the housings 23 are rigidly secured pairs of supports 45 and 46 respectively (FIGS. 4 and 5). These supports 45 and 46 extend upwardly and downwardly respectively from the respective housings 23. Each housing 23 has two supports 45, which lie in a vertical plane extending transversely of the direction of movement A and, viewed from the side, they are located symmetrically on either side of a vertical plane going through the pivotal axis 22A. Viewed from the side, one of the supports 45 is located near the vertical plane going through the rear surface of the transverse girder 18. The supports 46 are located perpendicularly beneath the associated supports 45. The supports 45 have a length, in the vertical direction, substantially twice that of the supports 46. Near the ends of each support 45 and 46 remote from the housing 23 is provided a bearing for a pivotal shaft 47 or 48 respectively. The pivotal shafts 47 and 48 are substantially horizontal and parallel to one another and to the vertical longitudinal plane of symmetry of the tractor. The vertical distance between the pivotal shafts 47 and 48 is substantially equal to two-thirds of the diameter of a rear wheel 3 or 4 so that, as shown in the elevation of FIG. 5, the pivotal shaft 47 is located approximately at the level of the highest point of the rear wheels 3, 4. Carrier links 49 and 50 are adapted to turn about the respective pivotal shafts 47 and 48. Each of the carrier links 49 and 50 has near the respective pivotal shaft 47 or 48 a portion having a longitudinal bore whereby it surrounds the corresponding pivotal shaft, and the width of this portion is such that it just fits in between the respective adjacent supports 45 and 46. The carrier links 49 and 50 narrow outwardly, viewed on plan (FIG. 4), so that a portion located between the wheels 3 and 4 is narrower than the distance between the nearest points of the outer circumferences of the wheels 3 and 4. At their ends remote from the pivotal shafts 47 and 48 respectively these narrowed portions of the carrier links 49 and 50 are formed into sleeves 51 and 52 respectively, the bores of which hold pivotal shafts 53 and 54 respectively. The pivotal shafts 53 and 54 are parallel to the pivotal shafts 47 and 48 and are located at a distance beyond the outermost vertical boundary surfaces of the wheels 3 and 4. As viewed in the side elevation of FIG. 3 the sleeves 51 and 52 are seen located in the space between the two wheels 3 and 4. The pivotal shafts 53 and 54 are longer than the associated pivotal shafts 47 and 48 and they extend to the front and the rear (FIG. 3) beyond the rotary shafts 33 and 31 respectively of the wheels 3 and 4. The pivotal shafts 53 and 54 are journalled near their two ends in the ends of vertical supports 55, 56 and 57, 58 respectively. The supports 55 and 57 correspond to a leading driving wheel 59 of the supporting element 13 and the supports 56 and 58 correspond to a trailing driving wheel 60 of the element 13 (FIG. 3).

Since the description following now is applicable to both of the driving wheels 59 and 60 of the supporting element 13, which are identical, reference will only be made to the leading driving wheel 59 in conjunction with the rear wheel 3.

It should be noted, however, that the centerlines of the pivotal shafts 53 and 54 and those of the pivotal shafts 47 and 48 (FIG. 5) are located at the corners of a parallelogram linkage. This parallelogram linkage, which acts as a lifting device for the respective supporting element 13, can be displaced by a hydraulic cylinder 61 (and 62 for the supporting element 13 on the other side of the tractor) that can be actuated from the cab 14. These cylinders are pivotally mounted on the housing of the hydraulic pump 19 by substantially horizontal pivotal shafts 63 and 64, extending in the direction of movement A. The pivotal shafts 63 and 64 are arranged on the top of the pump 19 (FIG. 4). Where the two housings 23, together with their corresponding rear wheels and supporting element 13, are pivotable independently of one another about the pivotal axis 22A, the pivotal shafts 63 and 64 have to be pivotable about additional upright pivotal shafts (not shown) with respect to the housing of the pump 19. In the embodiment shown the pivotal shafts 63 and 64 are directly connected with the pump 19 by means of plates 65 and 66 extending transversely of the direction of movement A. The piston rod of the cylinder 61 is pivotally connected by means of a pivotal shaft 67 extending parallel to the pivotal shaft 47 with a pair of levers 68, which are rigidly connected with the associated carrier link 49 and extend downwardly away from the pivotal shaft 47.

Figure 6:
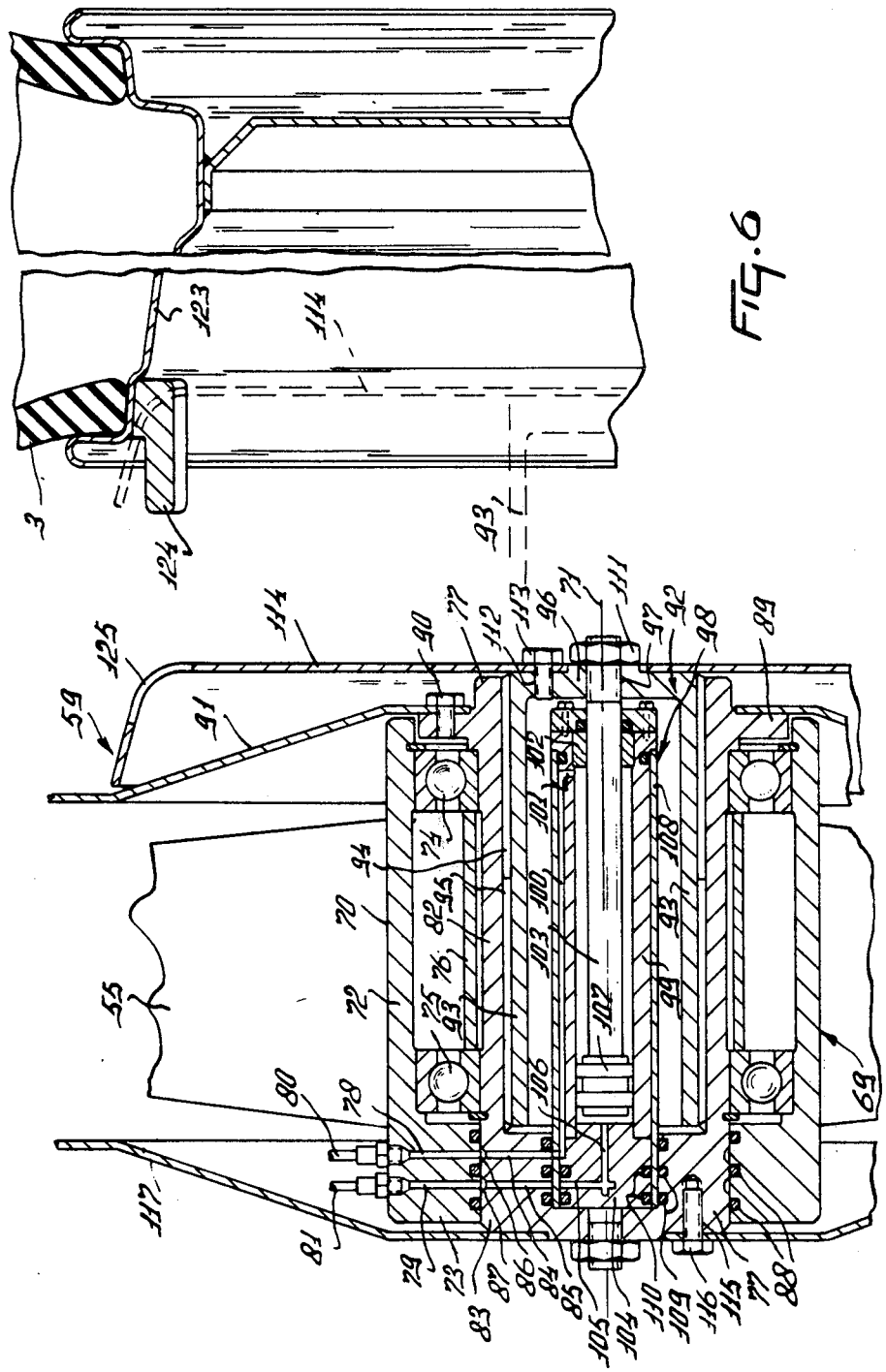
FIG. 6 is a sectional view taken on the lines VI—VI in FIG. 3.

The construction of the leading driving wheel or supporting wheel 59, which construction is identical to that of the trailing driving or supporting wheel 60 of the supporting element 13, is apparent from FIG. 6. The diameter of each supporting wheel 59 and 60 is slightly greater than that of the wheels 3 and 4. The two supports 55 and 57 are rigidly secured to an outer part 70 of a hub 69 at its top and bottom. This part 70 is fixed against rotation relative to the tractor frame during the operation. The part 70 is coaxial with the center line 71 of the wheel axle of the driving wheel 59. The shape of the part 70 is shown in the sectional view of FIG. 6. The part 70 has a cylindrical portion 72 having an inner diameter which exceeds that of a further cylindrical portion 73 on the side of that part 70 remote from the wheel 3. The portion 72 holds the outer rings of two axially spaced bearings 74 and 75, the inner rings of which are held apart by means of a spacer sleeve 76. The inner rings of the bearings 74 and 75 rest on the outside of a portion 77 of the hub 69, which is located inside the part 70. The wall portion 73 of the part 70 has two radial bores 78 and 79 for the inlet and outlet respectively of hydraulic fluid, which communicate through hydraulic pipes 80 and 81 and a slide with the pump 19. The portion 77 also has a cylindrical portion 82 which has a comparatively large internal bore relative to a cylindrical portion 83 on the side remote from the wheel 3. The portion 83 of the part 77 has two radial bores 84 and 85, which communicate with the bores 78 and 79 of the portion 70 through a pair of circumferential grooves 86 and 87 which allow for rotation of the portion 77 with respect to the part 70. The bores 84 and 85 of the portion 77 open out in the grooves 86 and 87 respectively. Near the grooves 86 and 87, the inner surface of the portion 73 has circumferential recesses 88, two of which are located one on each side of the pair of bores 78 and 79 and the third of which is located between the two bores 78 and 79. The recesses contain sealing rings for preventing undesired fluid leakage along the contact surface of the portions 73 and 83 between the bores 78 and 79 or 84, 85 or to the exterior.

On the side of the portion 77 facing the wheel 3 the portion 82 has a radially outwardly extending, continuous flange 89 having a plurality of tapped holes which receive bolts 90 securing an inner wheel flange 91. The portion 77, which is coaxial with the centerline 71, has an internal piece 92, which is also coaxial with the centerline 71 and which has a U-shaped cross-section as shown in FIG. 6. A cylindrical portion 93 of the internal piece 92 has an outer diameter slightly smaller than the inner diameter of the portion 82 of the portion 77.

The inner surface of the portion 82 has axial keys 94 extending from the end facing the wheel 3 over part of its axial length. The outer surface of the cylindrical portion 93 also has axial key ways 95, which cover the whole axial length of the portion 93. The key ways 95 are shaped so that they can co-operate with the key ways 94 of the portion 82 of the hub portion 77. Therefore, the internal piece 92 is slidable with respect to the portion 77 in an axial direction, that is to say parallel to the centerline 71, but with respect to rotation about the centerline 71 it is coupled with the portion 77. The cylindrical portion 83 of the internal piece 92 has on the side facing the wheel 3 an annular end piece 96, which is coaxial with the centerline 71 and which has a tapped hole 97, which is also coaxial with the centerline 71. The internal piece 92 surrounds a hydraulic cylinder 98, which, likewise, is coaxial with the centerline 71 and contains a piston 107. The cylinder 98 has a cylinder wall 99 having on the outer side an axial groove 100. At the end nearer the wheel 3 the groove 100 meets a radial bore 101, which opens out near packing 102, so communicating with the space inside the cylinder wall 99. The packing 102 seals a piston rod 103, which is connected to the piston 107 and projects from the cylinder 99 through the packing towards the wheel 3. At its end farthest from the wheel 3 the cylinder wall 99 is secured to a terminal block 104, which is accommodated in a correspondingly shaped cavity formed by the cylindrical portion 83 of the portion 77. The terminal block 104 has a radial bore 105 thus, which is in permanent communication with the bore 85 of the portion 77. The bore 105 joins a bore 106 which is coaxial with the centerline 71 and opens out into the space inside the cylinder wall 99 on the side of the piston 107 remote from the wheel 3. The groove 100 in the outer surface of the cylinder wall 99 is covered by a cylindrical sheath 108 and is closed at one end by a flangeshaped rim of the cylinder wall 99 and at the other end by the outer surface of the terminal block 104. Since the cylindrical sheath 108 surrounds the cylindrical outer surface of the terminal block 104, uninterrupted grooves 109 are provided in the cylindrical portion 83 which contain sealing rings to seal between the portion 83 of the part 77 and the cylindrical sheath 108, so to prevent leakage of fluid from the groove 100 and the bore 105 (which communicate locally with the bores 84 and 85 respectively). Grooves 110 are also provided which contain sealing rings to seal between the terminal block 104 and the cylindrical sheath 108.

The end of the piston rod 103 remote from the piston 107 has a screw-threaded portion fitting in the tapped hole 97 of the end piece 96, where it is secured by a nut 111. The end piece 96 of the internal piece 92 has furthermore a plurality of tapped holes 112, the centers of which are located on a circle centered on the centerline 71. By means of bolts 113 screwed into the holes 112 a coupling part in the form of a coupling felly 114 is fastened to the internal piece 92 so as to be coaxial with the center line 71. On the side of the hub 69 remote from the wheel 3 the portion 83 of the portion 77 also has a plurality of holes 115 having internal screw-threads. By means of bolts 116 screwed into these holes 115 and having their center lines located on a circle also centered on the center line 71 an outer wheel flange 117 is clamped against the portion 83. The wheel flanges 91 and 117 have at their outer peripheries a plurality of cavities 118 spaced apart by a distance equal to the pitch of pins 119 bridging the distance between the wheel flanges 91 and 117 and serving as pivotal shafts for links 120 of the endless track laying chain 121 which is a well-known type seen on "Caterpillar" tractors extending around the two driving wheels 59 and 60 (FIG. 3). The links 120 are disposed in pairs one on each side of the supporting structure 13 and each pair carries a filling plate having one or more extensions 122 for increasing the gripping engagement of chain 121 with the ground. The wheel flanges 91 and 117 are not connected with one another except at the hub 69 and by chain 121 so that the shafts 53 and 54 can extend from the sleeves 51 and 52, disposed outside the driving wheels 59 and 60, to between the wheel flanges.

FIG. 6 shows a wheel rim 123 holding a tire of the wheel 3. This rim 123 is provided on its outboard side with extensions 124 evenly distributed around the circumference of the rim 123 and having each an L-shaped cross-section, the longer limb projecting towards the associated driving wheel (in FIG. 6 the wheel 59) and having near its free end a tapering end portion. The coupling felly 114 associated with the driving wheel 59 has, near its radially outer edge, openings 125 disposed around the center line 71 and provided in the felly 114 so that the extensions 124 of the wheel 3 can snap into them when the felly 114 is shifted in a direction parallel to the centerline 71 towards the wheel 3. This position of the coupling felly 114 is indicated by broken lines in FIG. 6. In the position indicated by solid lines in FIG. 6 the coupling felly 114 is located at a distance, measured in the direction of the centerline 71, from the boundary surface of the rim 123 of the wheel 3 facing the driving wheel 59. This distance may be 25% to 50% or more of the width of the wheel rim 123, measured in the direction of the centerline 71.

As stated above, the tractor may be equipped with implements 10 to 12, which can be attached to the hindmost and foremost and also to the lateral lifting devices 8 and 9. When such implements are attached, and project laterally from the tractor for some distance, heavy imbalanced forces may be expected, depending on the kind of implement and the ground conditions, for example. These forces may tend to swing the tractor about a vertical axis. Control of the tractor by means of the steerable wheels 2 may not be sufficient to maintain a desired course. A weak soil may affect the course of the tractor and may allow excessively deep penetration of the driven wheels 3 and 4 into the ground so tht the position, such as the height, of the attached implements with respect to the ground may be adversely affected to an extent such that the desired job is not satisfactorily performed. If soil conditions are worse, the tractor wheels, particularly the driven wheels, may dig into the ground to an extent such that progress is halted.

With a view to such conditions the supporting elements 13 are provided on the outboard sides of the driven wheels 3, 4 so that they can be put into operation if needed in order to avoid the effects just mentioned.

The engine 5 drives, through the auxiliary shaft 20, the hydraulic pump 19, which drives the wheels 3, 4 and the power take-off shaft 21. The power take-off shaft 21 can drive the implements attached to the tractor at constant speed. Of course, a second power take-off shaft may be provided at the front of the tractor near the lifting device 7, this second shaft being, for example, directly driven by the engine 5. The implements coupled with the lifting devices 8 and 9 can be driven by power take-off shafts coupled via a gear box with the engine 5, these shafts extending transversely of the direction of travel A and being each disposed near a lifting device in the neighborhood of a frame beam 17.

Power take-off shafts directly drivable by the engine 5 through a reduction gear and disposed near the lifting devices 7 to 9 have the advantage that the speed thereof may be constant, when the engine 5 is a Diesel engine.

The two hydraulic motors 28 can be directly driven by the hydraulic pump 19 through hydraulic conduits. The output shafts of the hydraulic motors 28 drive, via the two reduction gears 29, the chain sprocket 32 in the housing 23 and hence also the wheel axle 31 and the wheel 4. By means of the chain 35 passed around the sprocket 32 the chain sprocket 34 and hence the wheel axle of the wheel 3 are also driven. The fluid present can also be supplied by the pump 19 to pressurize one or the other side of the piston of the hydraulic cylinder 43. By means of a slide in the cab 14 the driver can set the position of the piston rod of the cylinder 43. When the piston rod is moved outwardly from the cylinder, the coupling rod 39 will move in the same direction so that the pivotal shafts 38 of the hydraulic motors 28 are turned via the control arms 37, the rate of flow of fluid through the motors 28 being affected so that as the rate of flow to one motor 28 is increased that to the other motor 28 is simultaneously decreased, perhaps the zero, or perhaps even so that the motor concerned is reversed. It is thus possible to drive the wheels 3 and 4 (and, as will be described more fully later in this description, also the supporting element which may be coupled with the wheels 3 and 4) on one side of the tractor faster than the wheels 3 and 4 on the other side of the tractor (and its supporting element, if it is coupled), which may not be driven at all, or may be driven in the reverse sense. Thus, with a corresponding position of the steerable wheels 2, a very sharp turn can be made, the tractor turning about a vertical axis located approximately in its plane of symmetry. Similarly, with a smaller deflection of the piston rod of the cylinder 43 with respect to the central positon, the course can be corrected in the event of asymmetrical forces or resistances.

The pairs of wheels 3 and 4 together with the two housings 23 can turn together about the pivotal axis 22A, since the pump 19 is adapted to turn about this axis with respect to the frame 1. The stiffening element 36 prevents excessive deflections relative to the frame beams 17. The alternative structure, already mentioned, permits the wheels 3 and 4 on one side of the tractor to turn relatively to the wheels 3 and 4 on the other side about the pivotal axis 22A, when the housings 23 can freely turn with respect to the supports 22. With this structure both of the two wheels of each pair 3, 4 are certain to be in contact with the ground. This also applies to the actuable supporting elements 13, which bear on the ground throughout their length. To allow for these movements of the housings 23 with respect to the transverse girder 18, the connection of the control arms 37 with the coupling rod 39 by means of ball joints 40 as well as the telescopic structure of the control arms 37 are important.

The supporting elements 13, each being mainly formed by the driving wheels 59 and 60 and chain 121, can be set at will in different positions with respect to the associated wheels 3 and 4. The position shown in FIG. 5 by broken lines, in which the supporting elements 13 are free of the ground, is suitable for running along paved roads, in which the tractor is in contact with the road solely by the wheels 2, 3 and 4, and also in those cases in which the soil is sufficiently hard during operation of the attached implements. The supporting elements 13 can be removed entirely from the tractor by releasing the pivotal shafts 47, 48 and 67 or the pivotal shafts 53 and 54. Intermediate positons may be important, in which the bottom sides of the supporting elements 13 are close above the ground or just in contact with the ground, said elements then increasing the track width and the contact surface of the tractor on the ground in order to obtain higher stability. If the elements 13 are then in contact with the ground, chain 121 and the driving wheels 59 and 60 rotate freely during the run of the tractor in a manner not shown. In this case the elements 13 are driven by the ground contact. These positions are attained by pushing the piston rods of the hydraulic cylinders 61 into the two cylinders by means of a control slide provided in the driver's cab 14. Thus the carrier liks 49 are moved downwardly by the levers 68 so that, owing to the parallelogram linkage 49, 50 the elements 13 move down parallel to one another, i.e. without pivoting. The driver can control the inward movement of the piston rods of the cylinders 61 and 62 at will so that he can determine how firmly the elements 13 are pressed into the soil. It is advantageous to have the possibility of actuating the cylinders 61 and 62 independently of one another.

FIG. 5 shows a particular position, indicated by solid lines, of the supporting elements 133 with respect to the rest of the tractor, in which it is possible to drive the element from the tractor. In this position, the lower part of chain 121 is located beneath the lowest points of the wheels 3 and 4. In this case, which applies for example, to a weak soil, the weight of the tractor is supported on the ground to a large extent by the elements 13.

When the parallelogram linkage, whose corners are formed by the pivotal shafts 47, 48, 53 and 54, is moved by means of the hydraulic cylinder 61 into the position indicated by solid lines in FIG. 5 (which position may be defined by a stop, not shown), the centerline 71 of each of the driving wheels is approximately in line with the centerline of the neighboring wheel 3 or 4. On the basis of this position, in which the coupling portion 114 is in the position indicated by solid lines in FIG. 6, hydraulic, high-pressure fluid is admitted by means of a control-slide actuated by the driver through the pipe 81 so that this pressurized fluid can pass through the bores 79, 85, 105 and 106 to the space between the outlet opening of the bore 106 and the piston 107 to cause the piston rod 103 to move outwardly from the hydraulic cylinder 98. Since the piston rod 103 is fastened near its outermost end to the end piece 96 of the internal piece 91, this internal piece moves towards the wheel 3. Since the coupling felly 114 is fastened by means of the bolts 113 to the internal piece 92, it also moves towards the wheel 3 until the tapering extensions 124 snap into the corresponding openings 125 of the coupling felly 114, which is then urged against the tire rim 123. The extensions 124 may transfer torque from the wheel 3 to the coupling felly 114 and hence to the driving wheel 59. The driving torque exerted on the wheel 3 is thus partly transferred by the wheel 3 to the ground and partly via the extensions 124 to the coupled driving wheel 59, when the wheels 3 and 59 are both in contact with the ground, whereas in the case in which the wheel 3 is not or only hardly in contact with the ground and the driving wheel 59 is pressed into weak soil, the driving torque exerted on the wheel 3 is transferred completely to the wheel 59. The admission of pressurized fluid through the pipe 81 for the two driving wheels 59 and 60 on one side of the tractor can be done independently of the wheels 59 and 60 on the other side of the tractor. If it is desired to remove the elements 131 from the tractor, they can be urged laterally away from the rest of the tractor (after disconnection of the pivotal shafts 47, 48, 67,53 and 54 respectively), when the maximum stroke of the piston rod 103 is proportioned in accordance herewith.

During the movement of the piston 107 and of the piston rod 103 towards the wheel 3 hydraulic fluid is fed back through the bore 101, the groove 100, the bores 78 and 84 and the pipe 80.

The movement of the central piece 92 towards or away from the wheel 3 when pressurized fluid is admitted through the pipes 81 or 80 is enabled because the key ways 95 of the central piece 92 are guided axially by the key ways 94 of the portion 77, which key way connection transfers also the torque exerted by the wheel 3 on the central piece 92 through the coupling felly 114 to the portion 77 and via the bolts 90 and 116 to the wheel flanges 91 and 117 and hence to chain 121. During operation the central piece 92 and the portion 77 rotate with the wheel 3, whereas the outermost portion 70 and the supports 55 and 56 secured thereto remain stationary with respect to the tractor frame during travel.

Instead of the elements 13, auxiliary wheels may be arranged in a similar manner at the side of the wheels 3 and 4. Such auxiliary wheels may, for example, be cage wheels, which are open on the side facing the neighboring wheel 3 or 4 so that an access is obtained for a lifting device similar to the device 49, 50 fastened to a hub similar to the hub 69.

It should be noted that an alternative drive may be conceived in which the rear supporting wheel 60 is directly driven by the wheel 4, while the front supporting wheel 59 is rotated via chain 121 by the supporting wheel 60 and the wheel 3 is coupled with the supporting wheel 59, the chain 35 being omitted. This arrangement may be advantageous when drive of the tractor normally takes place through chain 121.

Figure 7:
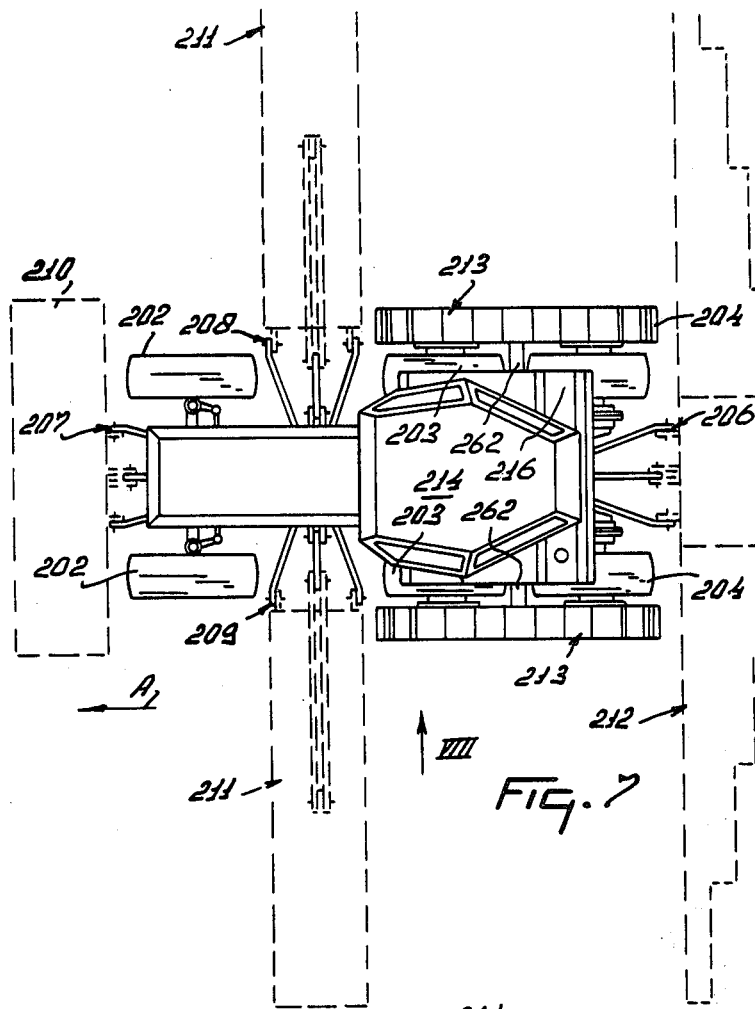
FIG. 7 is a plan view of another embodiment of a tractor.

The tractor shown in FIGS. 7 and 8 comprises a frame 201 supported by a pair of steerable front wheels 202 and two pairs of rear wheels 203 and 204, which can be driven in a manner to be described more fully later. It is, of course, also possible to use drivable front wheels 202. The frame 201 supports a combustion engine 205 having a power of about 250 HP for driving the pairs of rear wheels 203 and 204 and is located, as shown in the side elevation of FIG. 8, between the front wheels 202 and the leading pair of rear wheels 203. The rear of the tractor frame is provided with a hydraulically operable three-point lifting device 206 and at the front the tractor has a further three-point lifting device 207.

In the region between the front wheels 202 and the leading rear wheels 203 the frame is provided with two hydraulically operable three-point lifting devices 208 and 209 disposed symmetrically to the vertical, longitudinal plane of symmetry of the tractor and extending transversely of the direction of travel A. Thus implements such as seed drills or rotary harrows 211 and 210 respectively may be attached to the lifting devices 207, 208 and 209, the working widths of these implements overlapping one another in the direction of movement A. At the same time the lifting device 206 may be provided with a further implement, for example, a fertilizer distributor 212, the working width of which corresponds to that of the implements 210 and 211. The dimensions of the three-point lifting devices 208 and 209, measured transversely of the direction of movement A, are such that their outermost ends do not project beyond the outermost parts of the rest of the tractor.

Near each two rear wheels 203 and 204 located on one side of the longitudinal plane of symmetry of the tractor is provided a driving member or supporting element 213 which comprises an endless track laying chain and is proportioned so that the length of the element 213 measured in the direction of travel A approximately corresponds to the distance between the front side of the wheel 203 and the rear side of the wheel 204 concerned. Viewed from the side the element 213 just covers the two associated wheels 203 and 204. The supporting element 213 with the caterpillar chain is located on both sides of the tractor on the associated wheels 203 and 204. The overall width of the tractor amounts to about 250 cms.

Figure 8:
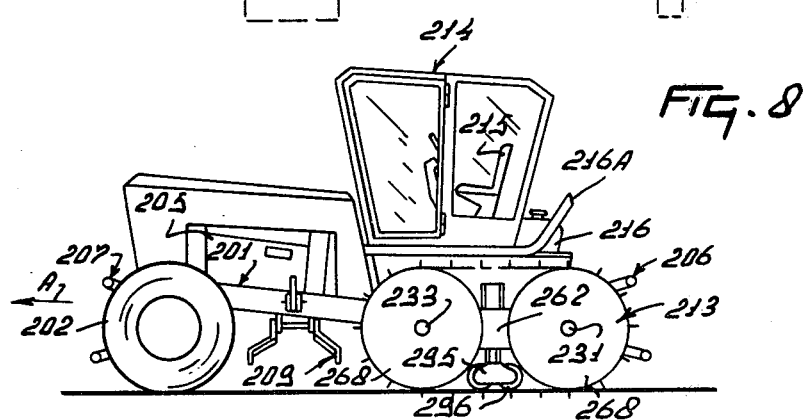
FIG. 8 is an elevational view of the tractor of FIG. 7.

The tractor comprises furthermore a driver's cab 214 having a driver's seat 215, the cabin being symmetrically arranged to the longitudinal plane of symmetry of the tractor and being disposed so that the seat 215 is located above the region between the rear wheels 203 and 204, viewed in the side elevation of FIG. 8. The driver's seat 215 together with at least part of the steering and other controls is adapted to turn about a vertical axis through an angle of 180° and to be fixed in two positions. Behind the cab 214 is located a fuel tank 216 which is situated, viewed from the side, above the leading half of the rear wheels 204 and extends transversely over approximately the whole distance between the vertical planes of symmetry of the two rear wheels 204, one on each side of the tractor. An exhaust pipe 216A of the engine 205 passes rearwardly along the bottom side of the cab 214 and is partly located beneath the cab and a platform serving as a mud guard. When it reaches the side of the tank 216 it bends upwardly in an inclined direction. The bottom of the cab 214 and the bottom of the tank 216 are located, viewed from the side, above the topmost points of the wheels 204 and of the track laying chain of the element 213.

Figure 9:
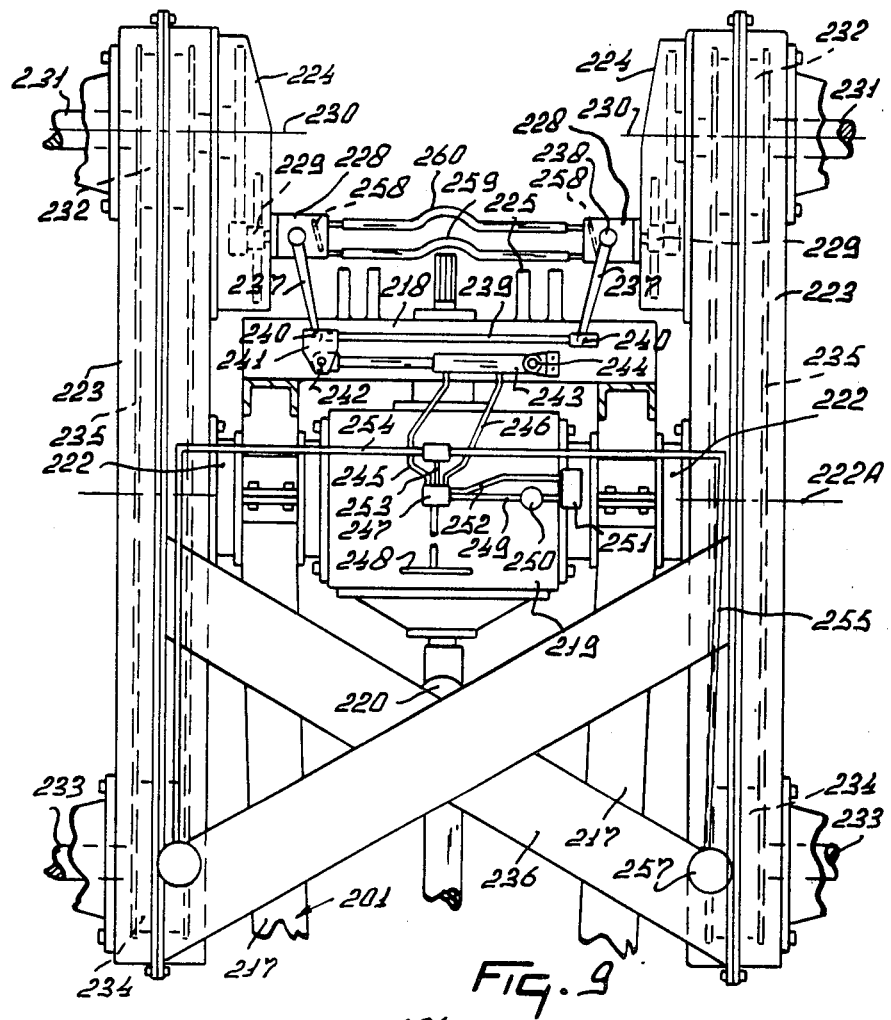
FIG. 9 is a plan view of part of the driving mechanism of the tractor of FIG. 7.
Figure 11:
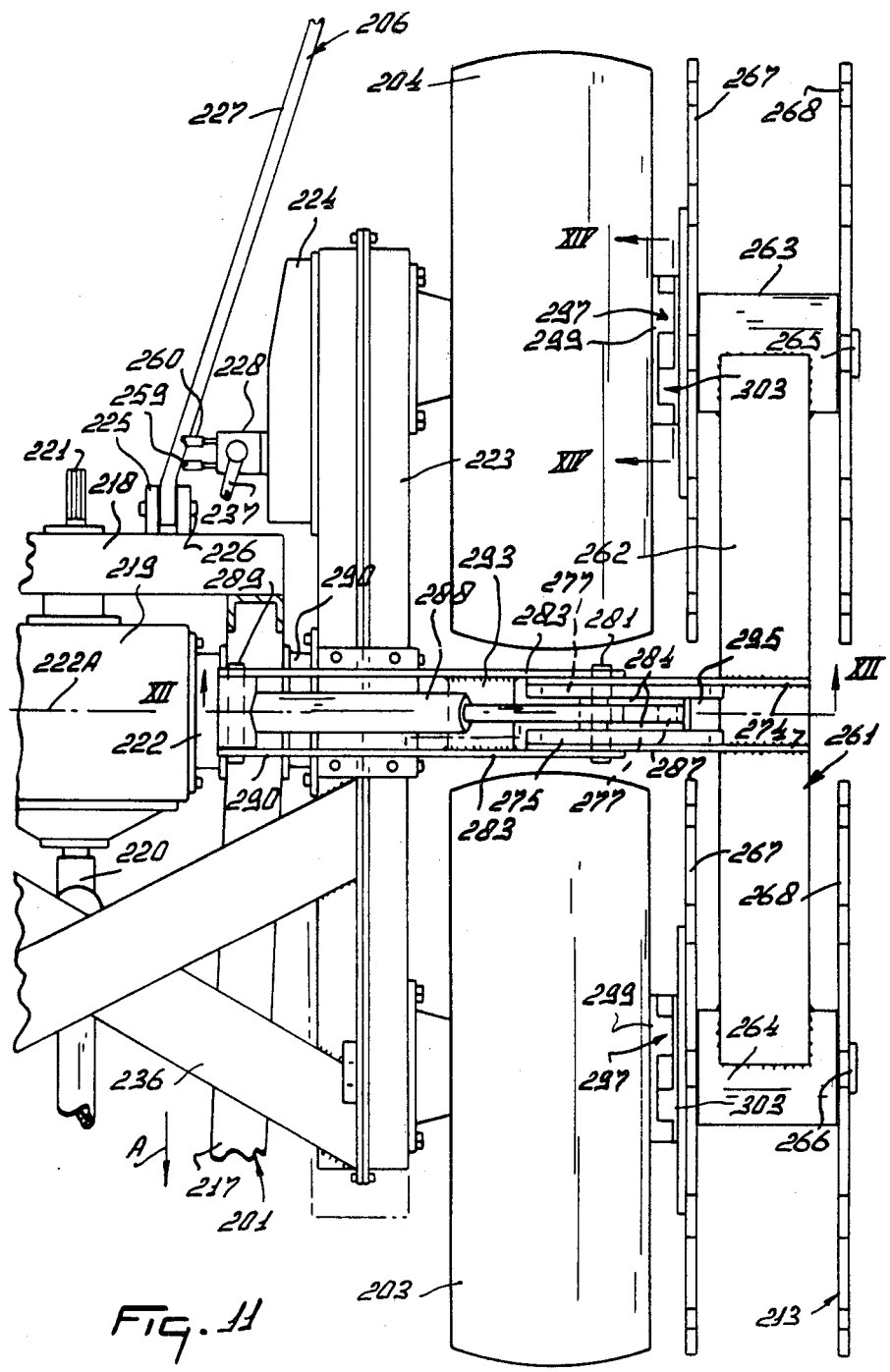
FIG. 11 is a sectional view of part of the tractor taken on the line XI—XI in FIG. 10.

FIGS. 9 and 11 show frame beams 217 of the frame 201 which are arranged symmetrically on either side of the vertical, longitudinal plane of symmetry of the tractor; also, because these beams support the lateral lifting devices 208 and 209, they may be torsion-resistant hollow beams. The two frame beams 217 are interconnected near their rear ends adjacent the rear wheels 204 by a transverse girder 218 and support a hydraulic pump 219 located in front of the transverse girder 218, viewed in the direction of travel A. This pump is drivable through an auxiliary shaft 220, which can be directly driven by the engine 205. The hydraulic pump 219 has a rearwardly extending output shaft 221, which can be directly driven by the shaft 220 at a constant speed and which serves as a power take-off shaft. The hydraulic pump 219 is rigidly secured to two supports 222 which extend transversely of the direction of travel and which are disposed one on each side of the pump 219, which is fastened by them to the frame beams 217 so as to be pivotable about a pivotal shaft on axis 222A which coincides with the aligned center lines of the cylindrical supports 222. These supports are each pivotable in a bushing fastened to the respective beam 217. Each support 222 extends outwardly beyond its beam 217. Housings 223 of transmission mechanisms are rigidly secured to the two outermost ends of the carriers 222, and these housings 223 are thus pivotable with respect to the frame 201 about the pivotal axis 222A. Near the rear of the housings 223 on their inner sides, are fixed housings 224 which have their front sides located just behind the rear of the transverse girder 218. The rear of the transverse girder 218 is provided with two groups of vertical tags 225. These two groups of tags are disposed at a distance from, and symmetrically about, the vertical plane of symmetry of the tractor. The two groups of tags 225 each hold a pivotal shaft 226 (shown in FIG. 11, but not in FIG. 9). The pivotal shafts 226 have their centerlines in line with one another. Between the two tags 225 of each group is arranged the front end of a lower arm 227 of a three-point lifting device 206, the two arms each being pivotable about the respective pivotal shaft 226, which extends substantially horizontally and transversely of the direction of travel A.

Since the construction is symmetrical about the vertical, longitudinal plane of symmetry of the tractor, the construction on only one side of that plane of symmetry will now be described.

Near the front and on the inner side of each housing 224 a hydraulic motor 228 is mounted which is connected to be driven by the hydraulic pump 219. Each of the two hydraulic motors 228 has an output shaft extending approximately horizontally and transversely of the direction of travel A and extending into the adjacent housing 224. This output shaft of the motor 228 drives reduction gearing 229 accommodated in the housing 224 and having also a substantially horizontal output driving shaft extending transversely of the direction of travel A and extending into the rear of the housing 223. The center line of the latter output shaft is designated by 230 in FIG. 9. This shaft is directly coupled with a wheel axle 231 journalled in the housing 223 and having one of the wheels 204 at its end projecting from the housing 223. The portion of the wheel axle 231 located inside the housing 223 is provided with a chain sprocket 232, which can also be driven via the reduction gearing 229 by the hydraulic motor 228. Viewed from the side, the chain sprocket 232 is located behind the rear of the transverse girder 218 and, therefore, at a distance behind the pivotal axis 222A. The housing 223 is symmetrical about the pivotal axis 222A and holds a further wheel axle 233 having a center line which is parallel to that of the wheel axle 231. The center line of the wheel axle 233 and the center line of the wheel axle 231 are equidistant from the pivotal axis 222A. The wheel axle 233 is also provided with a chain sprocket 234 arranged in the housing 223; the shape and size of this sprocket are equal to those of the chain sprocket 232. This wheel axle 233 is connected to the leading rear wheel 203. A driving chain 235 is passed over the sprockets 232 and 234 so that the leading rear wheel 203 can also be driven by the hydraulic motor 228. The assembly of the two drivable wheels 203 and 204, therefore, is pivotable about the pivotal axis 22A with respect to the frame 201.

The top and bottom sides of the two housings 223 are interconnected by two X-shaped stiffening elements 236 of plate-shaped strips located one below and one above the frame beam 217; these elements are welded to the two housings 232. The stiffening elements 236 may also serve as stops for limiting the movement of the housings 223 when they turn about the pivotal axis 222A by serving as abutments for the frame beams 217. Between the elements 236 and the frame beams 217 may be provided bump stops, for example of rubber. In an alternative structure, without the elements 236, the two housings 223 may be pivotable independently of one another about the pivotal axis 222A, the housings 233 and hence the two sets of wheels 203 and 204 being thus relatively pivotable. The two housings 223 may each be provided for this purpose with a stub shaft (not shown), which is freely pivotable in the associated carrier 222.

The two hydraulic motors 228 can be controlled in common with each other. For this purpose each motor 228 is provided with a control arm 237, which is pivotable with respect to the housing of its motor 228 about an approximately vertical pivotal shaft 238; such pivotal movement adjusts the rate of flow of fluid to its corresponding motor 228. The two control arms 237 are interconnected by a coupling rod 239 by ball joints. The arms 237 may constitute telescopic rods. The coupling rod 239 is provided with a lug 241 holding a substantially vertical pivotal shaft 242. A hydraulic cylinder 243 is fastened to the transverse girder 218 by means of a substantially vertical pivotal shaft 244 and a piston rod projecting from the cylinder 243 is pivotally mounted to the lug 241 by the pivotal shaft 242 (FIG. 9). The center line of the hydraulic cylinder is approximately horizontal and transverse of the direction of movement A. The hydraulic cylinder 243 has two hydraulic conduits 245 and 246, one at each end region. The conduits 245 and 246 are connected at their ends away from the cylinder 243 to a distribution slide 247, which is adjustable by means of a steering wheel 248 near the driver's seat 215. High-pressure fluid is supplied from a reservoir 251 to the distribution slide 247 through a conduit 249 communicating with the high-pressure side of a hydraulic pump 250. Excess fluid discharged by the pump 250 is conducted back to the reservoir through a conduit 252. With the distribution slide 247 also communicates a conduit 253 supplying two ducts 254 and 255, the ends of which communicate with hydraulic cylinders 256 and 257 respectively, which are disposed symmetrically about the longitudinal plane of symmetry of the tractor and are pivoted at one end to the bottom side of the driver's cab 214 (see also FIG. 10), and hence to the tractor frame. The cylinders 256 and 257 each contain a piston to which is connected a piston rod which is pivoted to the fronts of the housings 223 located beneath the cylinders. The piston rods of the cylinders 256 and 257 are fastened to the housings 223 vertically above the wheel axles 233 of the leading wheels 203.

The two hydraulic motors 228 are of the hydrostatic type and comprise in known manner a swashplate 258 (FIG. 9). The angle of the swashplate 258 can be adjusted by means of the arms 237 to adjust the output speed of the motor. The high-pressure sides of the two motors communicate with each other through a conduit 259 and the low-pressure sides communicate with each other through a conduit 260. The pump 219 supplies high-pressure fluid to the two motors 228 through conduits which are not shown.

Between the two rear wheels 203 and 204 located on each side of the longitudinal plane of symmetry of the tractor there is provided an elevating device 261 (FIGS. 10 to 12), by which the driving element 213 at that side of the tractor can be elevated from or lowered into the operative state from which it can be put into operative engagement with the wheels 203 and 204.

Figure 12:
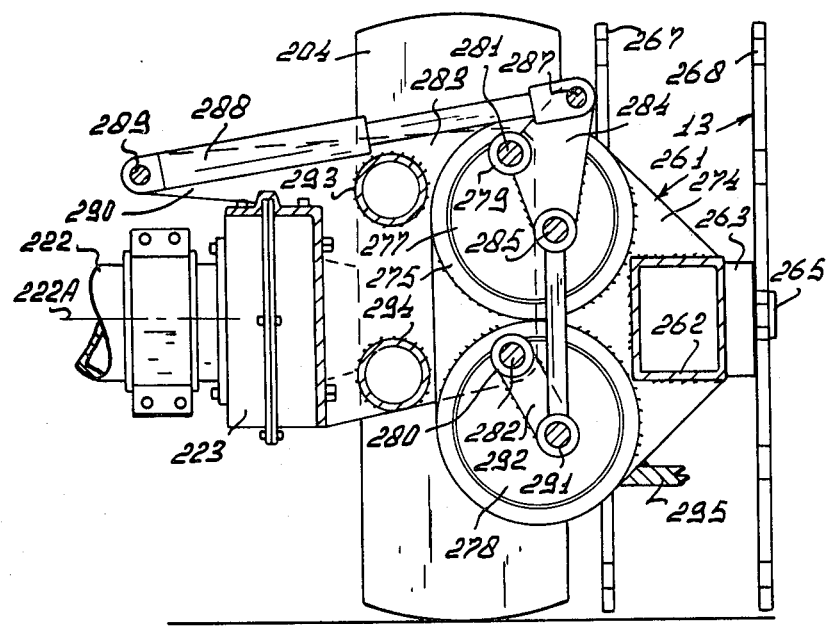
FIG. 12 is a sectional view taken on the line XII—XII in FIG. 11.

Each elevating device 261 comprises a carrier 262 extending in the direction of travel A and being symmetrical about the vertical plane of symmetry standing between the wheel axles 231 and 233. The carrier 262 has near its ends bushings 263 and 264, in which rotary shafts 265 and 266 are rotatably received. Near each bushing 263 and 264, each wheel axle 265 and 266 is provided with two chain sprockets 267 and 268, these being rigidly secured to their axle (FIGS. 11 and 12). The diameter of the chain sprockets 267 and 268 is approximately equal to that of the wheels 203 and 204. An endless track laying chain 269 (FIG. 10) is looped over the four sprockets 267 and 268 and has on each side a large number of links 270, which are interconnected by pins 271 extending parallel to the axles 265 and 266 and fitting into cavities 272 at the circumference of the sprockets 267 and 268. The links 270 are located in pairs, one on each side of the driving or supporting element 213. Each pair has a connecting plate having one or more projections 273 for enhancing the grip of chain 269 on the ground, the element 213 thus constituting and anti-skid device as well as serving a supporting function.

At a short distance to each side of the vertical plane of symmetry of the carrier 262 transverse of the direction of travel A there are vertically disposed plates 274, each of which is welded to three outer sides of the carrier 262. The shape of the plates 274 is shown in FIG. 12. To each of these two plates 274 are welded two rings 275 and 276, the centres of which are located in a vertical plane parallel to the longitudinal plane of symmetry of the tractor. In the sectional view of FIG. 12 the rings 275 and 276 are seen to be located just inboard of the carrier 262. The outer peripheries of the rings 275 and 276 are in contact with one another at a point located in a horizontal plane going through the center lines of the wheel axles 265 and 266 and the pivotal axis 222A, at least in the operative state of the element 213 shown in FIG. 12. One of the faces of each ring of each pair of rings 275 and 276 is coplanar with one of the surfaces of the plate 274 and the two pairs of rings 275 and 276, disposed symmetrically about the plane of symmetry between the centre lines of the wheel axles 265 and 266 are arranged at least partly between the rear wheels 203 and 204 and also between the two pairs of chain sprockets 267 and 268. In each of the rings 275 and 276 is arranged a circular plate or disc 277 and 278 respectively. These discs 277 and 278 are pivotable with respect to the plate 274 and the rings 275 and 276. To each of the plates 277 and 278 is rigidly secured a bearing bushing 279 and 280 respectively. These bushings are arranged near the top outer edges of the circular plates 277 and 278. The bearing bushings 279, 280 hold pivotal shafts 281 and 282 respectively, each of which extends through a hole in the respective plate 277 or 278 and also through elongate holes in the plate 274. The ends of the pivotal shafts 281 and 282 projecting from the plate 274 on the side remote from the circular plates 277 and 278 are rigidly secured to a supporting plate 283 extending from the pivotal shafts 281 and 282 towards the longitudinal plane of symmetry of the tractor; they are also perpendicular to the plane of symmetry and parallel to the adjacent plate 274. The shape of the supporting plate 283 is visible in FIG. 12. The supporting plate 283 is fastened to the outer top side of the housing 223 accommodating the driving mechanism for the rear wheels 203 and 204 and for the driving element 213. From FIG. 11 it will be apparent that the construction shown in the sectional view of FIG. 12 is symmetrical with respect to a vertical plane going through the pivotal axis 222A.

To the bearing bushing 279 and also to the circular plate 277 is welded a triangular lever 284, the bearing bushing 279 being located near one of the corners of the triangle. Near the lower corner of the lever 284, as shown in FIG. 12 is arranged a pivotal shaft 285, to which is pivoted a substantially vertical rod 86 extending downwards. Near the top corner of the lever 284, as shown in FIG. 12, there is fastened a pivotal shaft 287, about which is freely pivotable the end of a piston rod projecting from a hydraulic cylinder 288. The hydraulic cylinder 288 is pivotable about a pivotal shaft 289 fastened to an inwardly projecting lug of the supporting plate 283 extending over and across the housing 223 towards the longitudinal plane of symmetry of the tractor. The end of the rod 286 remote from the pivotal shaft 285 is freely pivotable about a pivotal shaft 291 fastened to the end of a lever 292, which is welded to the disc 278 and, at its other end, carries the pivotal shaft 282. The line connecting the center lines of the pivotal shafts 281 and 285 and that connecting the pivotal shafts 282 and 291 are approximately parallel to one another. As shown in the elevational view of FIG. 12 the pivotal shafts 285 and 291 are located near the centers of the plates 277 and 278 respectively and the rod 286 is approximately vertical. The centerline of the rod 286 is located, in the position shown in FIG. 12, where the supporting element 213 is in the operative state, as near as possible to the line connecting the centerlines of the pivotal shafts 281 and 282 and the outside of the rod 286 is almost touching the bushing 280. Between the two supporting plates 283 are furthermore welded two strengthening rings 293 and 294 in order to give stability to the structure. To the two lower rings 276 is fastened a support 295 (see FIGS. 10 and 12) in which two supporting rollers 296 for the caterpillar chain 269 are journalled.

Near the hub of each of the rear-wheels 203 and 204 is arranged a coupling member 297 (FIG. 11), which serves for coupling that rear-wheel with the adjacent chain sprocket 267 in the relative positions of the rear-wheel and the sprocket shown in FIG. 12 (which shows the operative state state of the supporting element 213). For this purpose each wheel 203 and 204 is mounted on an axle 298 which is provided with axial key ways (FIGS. 14 and 15). The wheel axle 298 is surrounded by an axially slidable sleeve 299 having internal key ways fitting in the key ways of the wheel axles 298. The sleeve 299 is provided near its outer edge with outwardly extending cams 300. The sleeve 299 is urged outwardly by a spring 301, while a ring 302 surrounding the wheel axle 198 prevents the sleeve 299 from being slipped off the wheel axle 298. Near the hub the chain sprocket 267 is provided with a cam plate 303 having three notches 304 covering a circumferential angle exceeding the circumferential angle covered by each of the cams 300. FIG. 15 shows that the wheel axle 298 has at its end a conical stub 305 fitting in a correspondingly shaped hole in the cam plate 303 in the position in which the supporting element 213 is coupled with the neighboring wheel.

In operation, when the tractor is provided with implements 210 to 212 attached to the first, rear and lateral lifting devices 208 and 209, and these implements project laterally over a large distance, heavy asymmetrical forces may be exerted on the tractor tending to turn it about a vertical axis, particularly under unfavorable soil conditions. Sometimes, it may not be possible to keep to a desired course using the steerable wheels 202 alone. Soil conditions may affect the course of the tractor and when operating in weak soil the driven wheels 203 and 204 may dig too deeply into the ground so that the positions of the attached implements with respect to the ground may be changed to an extent such that the desired work is not carried out correctly. If soil conditions are even worse the tractor wheels and particularly the drive wheels may dig into the ground far enough to halt the progress of the tractor.

For this reason the outer sides of the drive wheels 203 and 204 are provided with the supporting element or antiskid devices 213 which can be put into operation for obviating the aforesaid effects.

The engine 205 drives, through the auxiliary shaft 220, the hydraulic pump 219, and this in turn drives the wheels 203 and 204 and the power take-off shaft 221. The power take-off shaft 221 can drive the implements attached to the lifting device 206 at a constant speed. It is, of course, also possible to provide a second power take-off near the front at the lifting device 207, and this shaft may be directly driven by the engine 205. Implements coupled with the lifting devices 208 and 209 can be driven directly by power take-off shafts driven via a gear box by the engine, these shafts being transverse of the direction of travel A and being disposed each near a lifting device and being fastened to a frame beam 217. Power take off-shafts disposed near the lifting devices 207 and 209 and driven directly by the engine 205 through a reduction gear have the advantage that the speed of these shafts may be constant when the engine 205 is a Diesel engine.

The two hydraulic motors 228 can be directly driven by the hydraulic pump 210 through conduits (not shown). The output shafts of the motors 228 drive, through the reduction gearing 229, the chain sprockets 232 in the housings 223 and hence also the axles 231 and the wheels 204. By means of the chains 235 passing around the sprockets 232 and the sprockets 234 the axles of the wheels 203 are also driven.

The hydraulic pump 250 supplies high-pressure fluid through the conduit 249 to the distribution slide 247 controlled by the steering wheel 248. The distribution slide 247 directs the fluid through one or the other of the conduits 245 or 246 to the hydraulic cylinder on one or the other side of the piston. The high-pressure fluid can also be supplied through the conduits 253, 254 and 255 to the hydraulic cylinders 256 and 257. The high-pressure fluid can be supplied to the hydraulic cylinder 243 independently of the supply to the cylinders 256 and 257 by means of a slide operating independently of the distribution slide 247 and being actuated separately by the driver.

The combination of the two hydraulic motors 228 communicating with one another through the conduits 259 and 260 provides for ganged adjustment of the two swashplates 258 of the motors by means of the arms 237, which are intercoupled by the coupling rod 239 and adjustable by means of the cylinders 243. This combination provides a controllable transmission between the wheels sets 203 and 204 on the two sides of the tractor and also for the supporting elements 213 of they are coupled to the wheels. When the hydraulic cylinder 243 is actuated from one direction to the other by means of the steering wheel 248 and the distribution slide 247, the arms 237 move the two swashplates 258 of the wheels motors 228 in the opposite sense to each other so that the rate of flow of fluid through one motor 228 exceeds that through the other motor, as a result of which the set of drivable wheels 203 and 204 on one side of the tractor will have a speed differing from the set of wheels on the other side. One of the hydraulic motors 228 can therefore operate as a pump for the other hydraulic motor (via the conduits 259 and 260) so that the motors allow only limited differences between the speeds of the wheels on the two other sides of the tractor when travelling around bends. The difference between the speeds on the two sides of the tractor will cause the tractor to make a curve. When the tractor runs in a straight line, the swashplates are orientated symmetrically about the longitudinal plane of symmetry of the tractor. The coupling off the rear wheels by means of the coupled motors 228 operates as a differential lock because during skidding one of the set of wheels cannot rotate at a higher speed than the other set of wheels.

Figure 13:
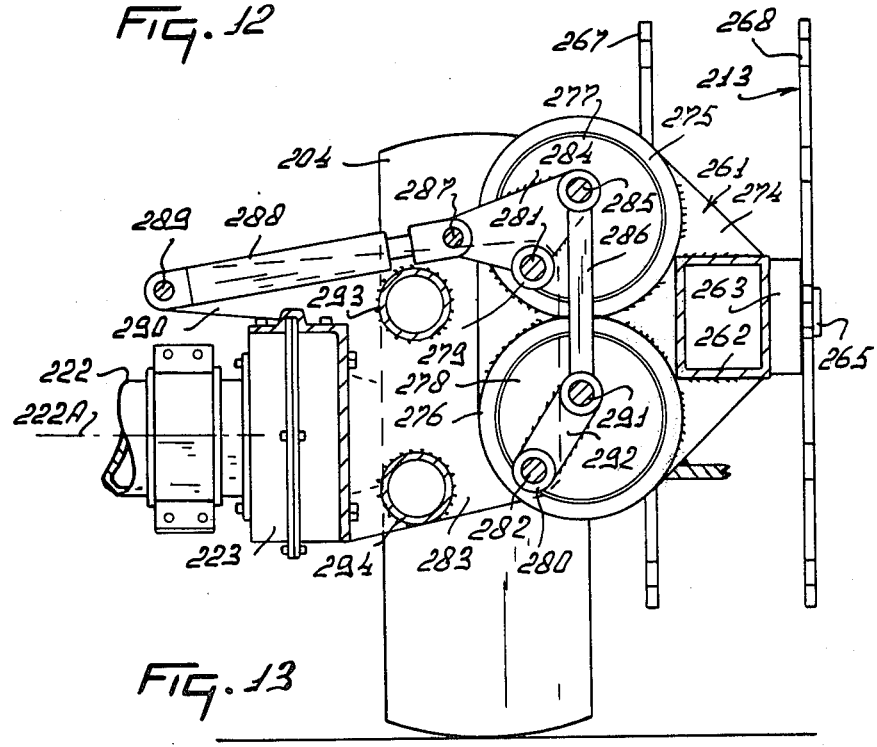
FIG. 13 shows a first embodiment of the construction shown in FIG. 12.

The driving elements 213 comprising the chain sprockets 267 and 268 and the caterpillar chain 269 can be moved into an operational position in which each pair of sprockets 267, 268 is driven by the adjacent wheel 203 or 204, the driving element being in contact with the ground (FIG. 12) and also into a position in which the driving element 213 is raised above the ground and the driving connection between the element and the adjacent wheels is discontinued (FIG. 13). When the two hydraulic cylinders 288 located on either side of the tractor frame are actuated from the driver's seat so that the piston rods are extended from the cylinders from the position shown in FIG. 13, the lever 284 is turned in a clockwise direction about the pivotal shaft 281 mounted between the supporting plates 283 so that the circular plate 277, which is fixed to the lever 284, also turns in the same direction about the pivotal shaft 281. The assembly of the ring 275, the plate 277 the pivot shaft 281 and the lever and the corresponding parts below them constitutes an eccentric mechanism. Because the levers 284 and 292 and hence of the discs 277 and 278 are coupled together the coupling rod 286, the levers 292 and the discs 278 rigidly secured to them are also turned. The center lines of the pivotal shafts 281, 282, 285 and 291 are located at the corners of a parallelogram and so the plates 277 and 278 will turn in an identical manner about the pivotal shafts 281 and 282 with respect to the supportingplate 283. Since the plates 277 and 278 are freely rotatable inside the rings 275 and 276, the plate 274, to which the rings 275 and 276 are rigidly secured, shifts in place parallel to itself, i.e. without pivoting, along an approximately semi-circular path. The plates 277 and 278 operate in this connection much like supporting levers for the plate 274, the weight of the driving element being supported, through the plates 274 and the rings 275, 276 on the discs 277 and 278. This clockwise movement about the pivotal shafts 281 and 282 brings the supporting element 213 into the position shown in FIG. 12. The dimensions are such that in the position shown in FIG. 12 the lower side of chain 269 is correctly in contact with the ground or has penetrated into the ground.

At the beginning of the downward movement of the supporting element 213 out of the position shown in FIG. 13, the element first moves outwardly from the wheels 203 and 204, and then approaches them during the second phase of its movement, the cam plate 303 coming finally in any position into contact with the cams 300 of the sleeves 299 which are slidable against spring pressure on the two wheel axles 298. More often than not, the cam 300 will come into contact with the outer face of the cam plate 303 and the force produced by the hydraulic cylinder 288 will compress the spring 301 so that the control stub 305 will move into the corresponding opening of the cam plate 303 (FIGS. 14 and 15). When the two motors 228 are put into operation by means of a slide actuated by the driver from his seat, the wheels 203 and 204 rotate, and the cams 300 of the four bushings 299 move along the outer faces of the cam plates 303 without initially driving the chain sprockets 267 and 268, which remain stationary because chain 269 is in contact with the ground. This relative movement between the cams 300 and the cam plate 303 ceases when the cams snap into the notches 304 in the cam plate 303, the cams 300 then each coming into contact with an end surface of the notch 304, into which it has sprung, the chain sprockets 267, 268 being then driven. The coupling members 299 to 303 thus operate as a dog clutch. The coupling members forming dog clutches are located beyond the inner boundary surfaces of the respective wheels 203 and 204 are preferably near their outer boundary surfaces. The cams 300 are received with some clearance in the notches 304 in the operative position to ensure that the coupling with the supporting element 213 will invariably be established after the wheels 203 and 204 are driven, while when executing turns, where speed differences occur between the two sides of the tractor, high varying loads are avoided.

The lines connecting the centerlines of the pivotal shafts 281 and 285 and 282, 291 respectively (FIG. 12) are at an acute angle to the line connecting the centerline of the pivotal shafts 281 and 282, as a result of which the supporting elements 213 will not initially move absolutely outwardly when changing from the position of FIG. 12 to the position of FIG. 13, but will move obliquely upwards in order to minimize the resistance to movement exerted by the ground. Nevertheless the ground pressure exerted on the supporting element 213 is transferred substantially directly through the discs 277 and 278 and the rod 286 to the pivotal shafts 281 and 282 and hence to the supporting plate 283; the angle between the line connecting the centerlines of the pivotal shafts 281 and 285 and the centerline of the rod 288 is not quite 180° in the position of FIG. 12. The resulting, very low torque is absorbed by the cylinder 288.

The obliquely upwards movement of the supporting element 213 at the beginning of the movement from the operative position of FIG. 12 into the position of FIG. 13 is permitted by the conical shape of the stub 305 and the corresponding shape of the hole in the cam plate 303 and by the fact that the cams 300 are received in the notches 304 with some clearance. In the sectional view of FIG. 12 the pivotal shafts 281 and 282 occupy a position such that they are near to a plane going through the coupling members 297.

FIG. 16 shows a further embodiment, in which a generally triangular plate 306 is provided through which extends the carrier 262, its four sides being welded to the plate 306. The plate is provided with two rings 307 and 308 lying one above the other, and these rings have external teeth. The spaces inside the rings contain circular plates or discs 309 and 310, which are, in this embodiment, rigidly secured to the corresponding rings. The two assemblies of rings and discs 307, 309 and 308, 310 respectively can turn relatively to the plate 306 about rotary axes 311 and 312 respectively extending normally to the supporting plates 283 and to the plate 306. The vertical plane going through the center lines of the rotary shafts 311 and 312 approximately coincides with the vertical plane of symmetry of the supporting element 213 in the direction of movement A. The plate 306 is furthermore provided with a chain sprocket 313, which is mounted for rotation on the plate 306 about a rotary shaft 314 which is perpendicular to the plate 306. In the operative position of the supporting element 213 shown in full lines in FIG. 16 this rotary shaft 314 is located in a horizontal plane going through the pivotal axis 222A on either side of which the rings 307 and 308 are symmetrically disposed. An endless chain 315 is looped over the chain sprocket 313 and the teeth of the rings 307 and 308. Near the periphery of the sprockets 313 is mounted a pivotal shaft 316, to which is pivotally connected the end of the piston rod of the cylinder 288. The discs 309 and 310 are provided with pivotal shafts 317 and 318 which are perpendicular to the plates 283 and 306 and are rigidly secured to extensions of the plates 283. The pivotal shafts 317 and 318 are rotatably journalled in the discs 309 and 310. The supporting element 213 can be raised from the operative position shown in full lines in FIG. 16, in which it is in contact with the ground, by supplying fluid to the cylinder 288 to retract the piston rod so causing the chain sprocket 313 to rotate in the counterclockwise direction. This causes the rings 307 and 308, as well as the discs 309 and 310 rigidly secured to them, also to rotate about the rotary shafts 311 and 312. The dimensions and particularly the distance between the rotary shaft 314 and the pivotal shaft 316 and the distances between the pivotal shafts 311 and 317, and 312 and 318 respectively as well as the ratio between the diameters of the chain sprocket 313 and of the rings 307 and 308 are such that rotation of the chain sprocket 313 through an angle of about 120° to 150° results in a rotation of each ring and disc to turn through 180° so that the pivotal shaft 317 in the raised position of the supporting element 213 is, with respect to the rotary shaft 311, in a diametrically opposite position as is the pivotal shaft 318, with respect to the rotary shaft 312. Since the positions of the pivotal shafts 317 and 318 are fixed relative to the plates 283, the plate 306 together with the chain sprocket 313 and the ring-disc combinations 307-310 are displaced upwards over a distance equal to twice the distance between the centerlines of the pivotal shafts 317, 318 and the respective rotary shafts 311, 312. Since the plate 306 is rigidly secured to the carrier 262, this shifts the supporting element 213 upwards over the same distance to the position shown in broken outline in FIG. 16. The supporting element or antiskid device 213 moves over a semi-circular path. In the position shown in FIG. 16 the centerlines of the pivotal shafts 289, 314 and 312 are located approximately in the same plane. The centerline of the cylinder 288 is, in the operative position of FIG. 16 and in the raised position, at an acute angle to that plane. In this embodiment the displacement of the supporting element 213 is thus achieved by rotating two eccentrics 307 to 310 by driving a third eccentric 313, 314, 316. An important advantage of the construction shown in FIG. 16 is that the vertical forces exerted on the supporting element 213 are directly transferred to the shafts 318 and 317 without exerting a torque so that the cylinder 288, in the operative positions of the supporting element 213, does not partake in the absorption of the ground pressure on the supporting element and only maintains the dead point position of the eccentrics 307 to 310. Of course, the proportion may be such that the lines of connection between the centerlines of the shafts 317 and 311, and 318 and 312 respectively are inclined to the vertical plane so that at the beginning of the movement from the operative position into the non-operative position the supporting element 213 moves obliquely upwards. The parts shown in the sectional view of FIG. 16 are also provided on the other side of the vertical plane going through the pivotal axes 222A and the cylinder 288 drives both groups.

Figure 17:
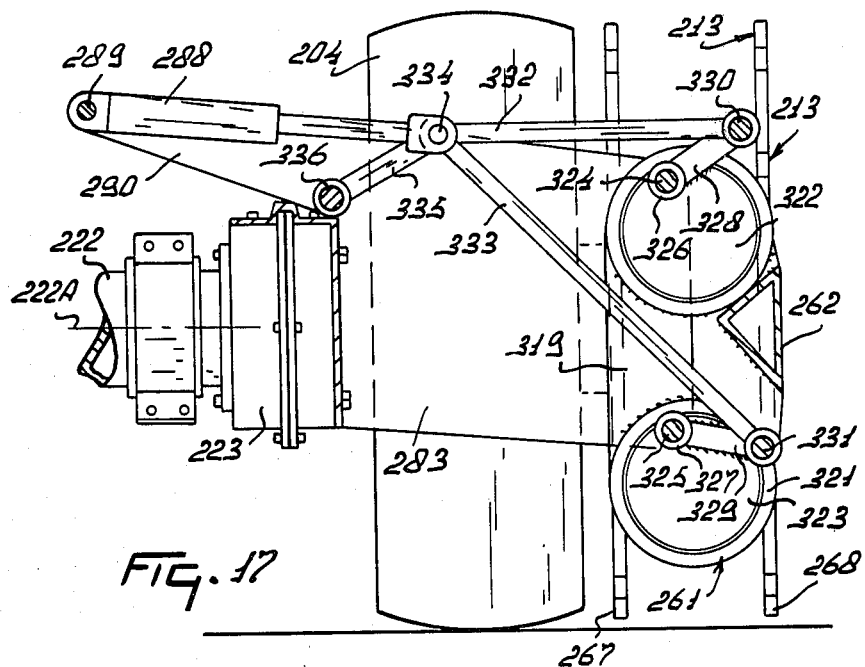
FIG. 17 shows a third embodiment of the construction shown in FIG. 12.

A third embodiment is shown in FIG. 17, in which a plate 319 rigidly secured to the carrier 262 is firmly fastened to two rings 320 and 321, the centers of which are located in the vertical longitudinal plane of symmetry of the supporting element 213. The plate 319 is welded to the carrier 262, which has a triangular section in this embodiment for structural reasons. The rings 320 and 321 support discs 322 and 323, which are rotatable in this embodiment with respect to the associated rings. The plate 319, the rings 320 and 321 and the discs 322 and 323 are supported by the plates 283 with the aid of shafts 324 and 325 mounted between the supporting plates 283. About the shafts 324 and 325 are pivotable respective bushings 326 and 327, to which are fastened respective arms 328 and 329. The arms 328 and 329 are rigidly secured to their discs 322 and 323. The arms 328 and 329 have respective pivotal shafts 330 and 331 at their ends remote from the pivotal shafts 324 and 325, on which are pivotally mounted connecting rods 332 and 333. The rods 332 and 333 are pivotally connected to the end of the piston rod of the cylinder 288 by a pivotal shaft 334, to which a fourth rod 335 is also pivotally connected. The end of the rod 335 remote from the pivotal shaft 334 is mounted for rotation about a pivotal shaft 336, which is firmly secured to the supporting plate 283 near the top of the housing 223. All of the pivotal shafts are perpendicular to the supporting plates 283 and hence to a vertical plane containing the pivotal axis 222A. The arm 329, in the position shown in FIG. 17, extends away from the shaft 325 substantially horizontally outwardly, whereas the arm 328 is inclined upwardly and outwardly away from the shaft 324. The two arms 328 and 329 are an angle of about 45° to one another. In the operative position shown in FIG. 17 the shafts 324 and 325 occupy the same positions as each other, with respect to their rings 320 and 321. They are displaced by an angle 10° to 20° from the top point of their discs 322 and 323, this angle being measured in the inward direction, as can be appreciated from FIG. 17. When the piston rod of the cylinder 288 is retracted from the operative position of FIG. 17, the rod 335 pivots to the left about the pivotal shaft 336, and the pivotal shaft 334 is thus displaced inward and upwards taking with it the ends of the arms 328 and 329, which are connected with the pivotal shaft 334 by the rods 332 and 333. Since the arms 328 and 329 are rigidly secured to the discs 322 and 323, the discs turn in the rings 320 and 321 about the pivotal shafts 324 and 325. The eccentric discs 322 and 323 act as levers, and displace the rings 320 and 321 outwardly and upwardly taking with them the plate 319, the carrier 262 and the supporting element 213. Since the pivotal shafts 324 and 325 are located on the inboard side of a vertical plane going through the centers of the discs 322 and 323, the supporting element 213 moves obliquely upwards from the ground at the beginning of its movement. As the piston rod retracts further, the pivotal shaft 330 moves near the line connecting the center of the disc 322 and the pivotal shaft 334, whereas the pivotal shaft 331 remains at a distance from the corresponding line connecting the center of the disc 323 and the pivotal shaft 334, so that even in the fully retracted position of the piston rod, the cylinder 288 exerts a torque on the supporting element 213. Since the pivotal shaft 334 moves as the rod 335 pivots during the elevation of the supporting or anti-skid device 213, the position of the parts with respect to a dead point position is varied.

Figure 18:
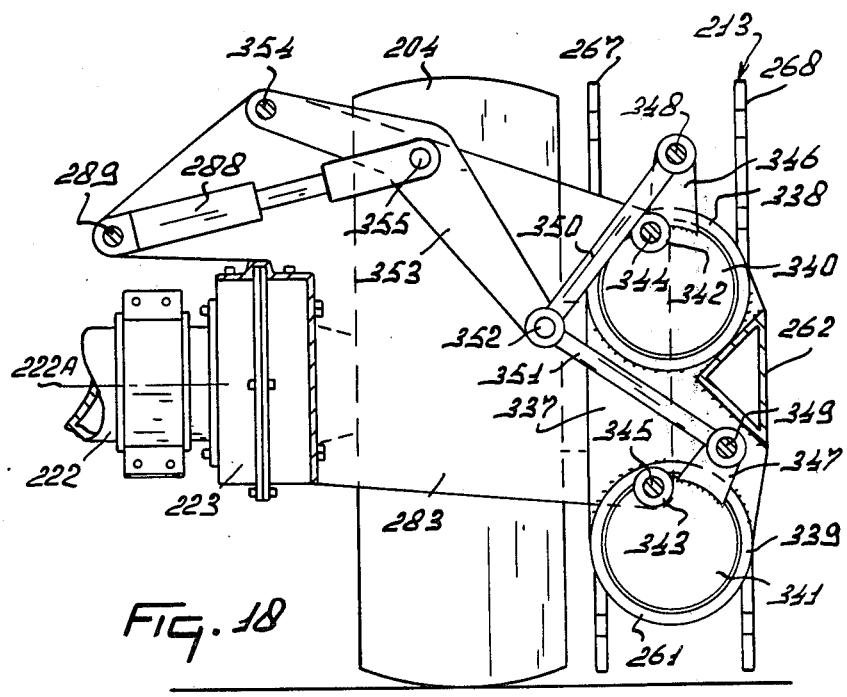
FIG. 18 showns a fourth embodiment of the construction shown in FIG. 12.

In the embodiment shown in FIG. 18 a plate 337 which is displaceable relative to the supporting plates 283 is provided with rings 338 and 339 firmly secured to the plate 337 and having their centers, as in the embodiment shown in FIG. 17, located in the vertical plane of symmetry of the supporting element 213. The spaces inside the rings 338 and 339 again contain circular plates or discs 340 and 341, which are adapted to turn in their rings and have the same diameters, as in the preceding embodiments. Each of the discs 340 and 341 has rigidly secured to it a sleeve 342 and 343, and these sleeves can pivot about pivotal shafts 344 and 345 respectively, each of which is firmly fastened to supporting plates 283. The centerlines of the pivotal shafts 344 and 345 are located inboard of, but near to, the vertical longitudinal plane of symmetry of the supporting element 213. The two circular discs 340 and 341 have arms 346 and 347 respectively. The arm 346 extends vertically upwards in the operative position shown in FIG. 18, whereas the arm 347 extends outwardly at an angle of about 30° to the vertical. The ends of the arms 346 and 347 remote from the discs 340 and 341 are provided with pivotal shafts 348 and 349 respectively, to which are pivoted rods 350 and 351 respectively. The ends of the rods 350 and 351 remote from the pivotal shafts 348 and 349 are both pivotally connected by a pivotal shaft 352 to a lever 353, having an end remote from the pivotal shaft 352 which is pivotally connected by a pivotal shaft 354 to the supporting plates 283. The two rods 350 and 351, in the operative position, are at an angle of 70° to 90° to one another, whereas the pivotal shafts 349, 352 and 254 are located approximately in the same plane. At a location between the pivotal shafts 352 and 354 the lever 353 has a pivotal shaft 355 which connects the piston rod of the cylinder 288 with the lever 353.

When the piston rod of the cylinder 288 is retracted, the lever 353 turns about the pivotal shaft 354 until its inner boundary line abuts the outer vertical boundary surface of the adjacent housing 223. During this movement the rods 350 and 351 pull the arms 346 and 347 to the left, so rotating the discs 340 and 341 in a counter-clockwise direction. The discs rotate about the pivotal shafts 344 and 345 fastened between the supporting plates 283. As in the preceding embodiment, the eccentrics formed by the discs 340 and 341 operate as levers to urge the rings 338 and 339 outwardly and upwardly, so that the supporting element 213 is elevated. Since the pivotal shafts 344 and 345 are located inboard of the vertical plane going through the centers of the discs 340 and 341, the supporting element 213 moves obliquely upwards from the ground at the beginning of the movement to the non-operative position. Since also in this embodiment the pivotal shafts 344 and 345 are located near to the vertical plane going through the centers of the discs 340 and 341, the ground pressure exerted on the supporting element or anti-skid device 213 is transferred substantially directly to the pivotal shafts 344 and 345 and hence to the supporting plates 283.

Figure 19:
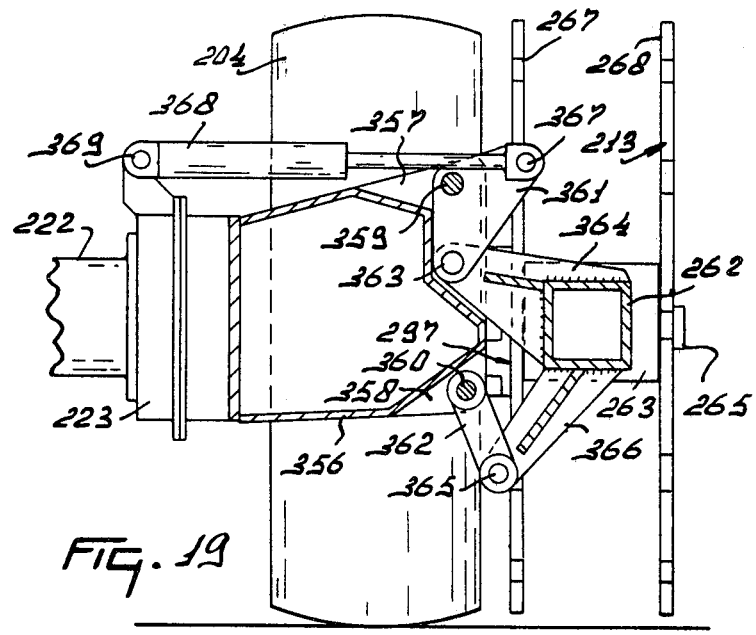
FIG. 19 shows a fifth embodiment of the construction shown in FIG. 12.

In the embodiment shown in FIG. 19 the outer side of the housing 223 is provided with a supporting structure 356 having on the outer side and on the top and bottom sides legs 357 and 358, holding pivotal shafts 359 and 360 respectively, about which levers 361 and 362 respectively are pivotable. To a pivot shaft 363 located beneath the pivotal shaft 359 in the position shown in FIG. 19 is pivoted a support 364. The support 364 is firmly secured to the carrier 262. The lever 362 extends downwards and is inclined outwardly in the operative position of FIG. 19 and is an angle of about 20° to 30° to the vertical. At its end opposite the pivotal shaft 360, lever 362 is provided with a pivotal shaft 365, about which a support 366 is pivotable, which is also firmly secured to the carrier 262. The distance between the centerlines of the pivotal shafts 359 and 363 is the same as that between the pivotal shafts 360 and 365. The pivotal shafts 359 and 360, as shown in the sectional view of FIG. 19, are located near the outer surfaces of the rear wheels 203 and 204. The lever 361 has furthermore a pivotal shaft 367, which is located at a higher level than the pivotal shaft 359 in the position of FIG. 19. To the pivotal shaft 367 is pivotally connected the piston rod of a hydraulic cylinder 368. This cylinder is pivotable with respect to the housing 223, about a pivotal shaft 369. When the piston rod of the cylinder 368 is retracted, the lever 361 turns about the pivotal shaft 359 fastened to the supporting structure 356 and the pivotal shaft 363 initially moves outwardly and moves along a semi-circular path to the non-operational end position, in which the supporting element 213 is not in contact with the ground. During this movement of the pivotal shaft 361 about the pivotal shaft 359 the support 366 of the carrier 262 is guided by the lever 362, which turns about the pivotal shaft 360. Owing to the inclined position of the lever 372 in the operational state of the supporting element or anti-skid device 213 the lower side of said device will initially move out of the ground in an upwardly inclined direction.

It will be appreciated that the driving coupling between the rear-wheels 203 and 204 and the adjacent sets of chain sprockets 267 and 268 described with reference to FIG. 14 and 15 may also be employed in the embodiments shown in FIGS. 16 to 19, although only one of the wheels 203 or 204 need have a coupling member 297.

Figure 20:
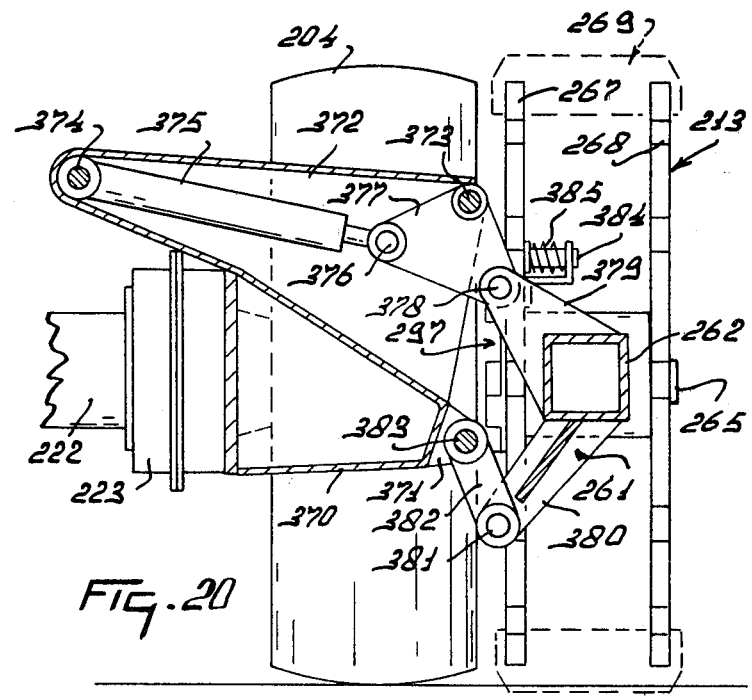
FIG. 20 shows a sixth embodiment of the construction shown in FIG. 12.

In the embodiment shown in FIG. 20 the outer side of the housing 223 is provided with a supporting structure 370, to which are welded supporting plates 371 and 372. The supporting plate 372 holds a pivotal shaft 373 for the supporting element 213 and a pivotal shaft 374 located further inwardly for a hydraulic cylinder 375. The end of a piston rod projecting from the cylinder 375 is pivotable about a pivotal shaft 376 on which is mounted one corner of a triangular lever 377. At another corner of the lever 377 is connected the pivotal shaft 373, and the third corner receives a pivotal shaft 378, about which a top lug 379 can turn. The lug 379 is firmly secured to the top and inner sides of the carrier 262. The bottom side of the carrier 262 is provided with an inwardly and downwardly inclined bottom lug 380, which is pivoted by its lower inner end by a pivotal shaft 381 to the lower outer end of an arm 382, which is connected by a pivotal shaft 383 to the lower supporting plate 371. The dimensions are such that the lines connecting the centerlines of the pivotal shafts 373 and 378, and 383 and 381, are parallel to one another and are inclined downwardly and outwardly. These centerlines are at an angle of about 20° to the vertical and the distances between the centerlines of the pivotal shafts 373 and 378, and 383 and 381 are equal. These centerlines are thus located at the corners of a parallelogram. Since the centerline of the hydraulic cylinder 375 passes below the pivotal shaft 373, the lever 377 turns counterclockwise in FIG. 20 when the piston rod of the cylinder 375 is extended, the supporting element or anti-skid device 213 thus moving outwardly and upwardly so that this element is lifted from the ground at the beginning of this movement. When the supporting element 213 is in the operative position, the vertical force exerted on the element will be transferred almost directly to the pivotal shafts 373 and 383, since the direction of the connecting lines between the pivotal shafts 373 and 378, and 383 and 381 are at a comparatively small angle to the vertical.

Figure 21:
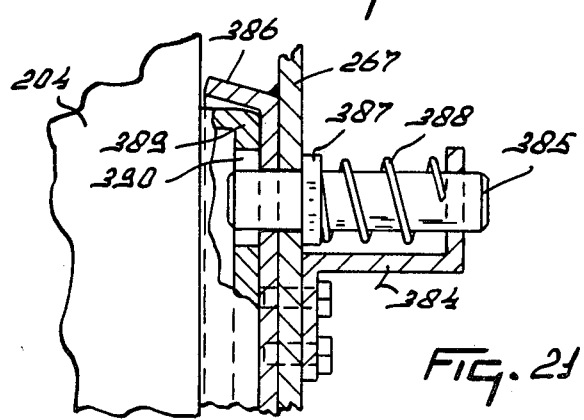
FIG. 21 shows on an enlarged scale part of the construction shown in FIG. 20.

The inboard chain sprocket 267 of the supporting element 213 is provided at one or more places on its outer face with a Z-section holder 384 (FIGS. 20 and 21) and an opening is provided in the head of this holder away from the chain sprocket 267. On the inwardly facing side of the chain sprocket 367 remote from the holder 384 an uninterrupted guide member 386 having a dish-shaped section is rigidly secured, the upright rims diverging away from the bottom of the member 386. Near the rim of the member 386 and at a distance from the shaft 265 a hole is provided which is disposed in alignment with the hole in the holder 384, the centers of these holes being on a line perpendicular to the chain sprocket 267. On the same line is located the center of a hole in the chain sprocket 267. Through these holes extends a pin 385, which is coaxial with such line. The pin 385 has a flange 387 which in normal operation bears on the inner side of the chain sprocket 267 as shown in FIG. 21. On the side remote from the chain sprocket 267 the flange 387 is loaded by a compression spring 388, which reacts against the head of the holder 384 having the hole. The pin 385 is prolonged on the side of the shoulder opposite to the spring 388 for a distance exceeding the thickness of the sprocket 267 and of the bottom plate of the member 386, the end of the pin 385 being bevelled.

If desired, this construction can be provided at several places around the chain sprocket 267. The felly of the corresponding wheel, here the wheel 204, is provided with a substantially cylindrical locking device 389, the centerline of which coincides with that of the wheel 204. FIG. 21 shows a sectional view of the locking device 389, which has a hole 390 extending in a head face of the device 389 which lies perpendicular to the wheel axis and in the operative position of the supporting element 213 the end of the pin 385 is located in the hole 390 with some clearance.

When the supporting element 213 is moved from the non-operative position into the operative position shown in FIG. 20, the flange 387 of the pin 385 is pressed against the inner surface of the chain sprocket 267 by the spring 388. During this movement the end of the pin 385 pointing towards the wheel 204 will, more often than not, come into contact with the head face of the locking device 389 shown in FIG. 21 and extending at right angles to the axle of the wheel 204 so that the spring 388 is compressed and the end of the pin 385 pointing towards the wheel 204 lies in the plane going through that surface of the bottom plate of the guide member 386 which faces the wheel 204. After the supporting element 213 has reached the position shown in FIG. 20, in which the piston rod of the cylinder 375 is retracted, the drive of the wheels 203 and 204, by the motors 228, is operated so that the wheels 203 and 204 rotate, the supporting element 213 then lagging behind due to the ground contact. The end of the pin 385 then slides along the outer surface of the head plate of the locking device 389 until this end is reached by a hole 390. The pin 385 will then snap into the hole 390 under the action of the spring 388 and will engage one side of the hole so that a driving torque will be transmitted from the wheels 203 and 204 to the supporting element 213. This coupling thus constitutes a pin and hole clutch. When the supporting element 213 is moved into the non-operative position and the piston rod is fully extended from the cylinder 375, the pin 385 can move straight out of the hole 390, since the driving element 213 initially performs an outward movement with respect to the wheels 203 and 204 and the bevelled end of the pin 385 is held in the hole 390 with an amount of clearance.

In all of the embodiments described hydraulic fluid can be supplied by means of the distribution slide 247 actuated by the steering wheel 248 during travel around bends via the conduits 253 to 255 to the two upwardly extending cylinders 256 and 257 (FIGS. 9 and 10) to retract the piston rods of these cylinders. When the supporting elements 213 are coupled by the coupling members shown in FIGS. 14 and 15 and FIG. 21 with the adjacent wheels 203 and 204. The assembly of the wheels 203 and 204 and the element 213 will be turned about the axis 222A with respect to the rest of the tractor so that the wheel 203 and the front part of the element 213 will be lifted from the ground so that only the wheel 204 and the adjacent part of the element 213 are in contact with the ground. The resulting position of the tractor driving members is advantageous in making comparatively sharp bends and if, for example due to soil conditions, the normal position of the wheels 203 and 204 and of the element 213 would give rise to trouble, for example, due to lateral ground forces. In this way steering through bends is facilitated. It is also possible to lift the wheel 203 from the ground with the element 213 in its non-operative position, in which it is off the ground by using the cylinders 256 and 257, so that only the wheel 204 is in contact with the ground. In both cases the height of the lifting devices 206 to 209 above the ground will vary so that the cylinders 256 and 257 may also be used when approaching an implement to be attached so to facilitate the attachment. It is furthermore possible to construct the slide 247 so that the piston rods of the cylinders 256 and 257 are moved down relatively to the cylinders upon the supply of high-pressure fluid so that a turn about the center line 222A is performed in the opposite sense. Contrary to the former case the tread of the tractor is temporarily reduced appreciably.

Instead of the supporting element 213 separate elements such as wheels may be coupled with the individual tractor wheels.

Although various features of the tractor which have been described and illustrated in the drawings, will be set forth in the following claims as inventive features, it is to be noted that the invention is not necessarily limited to these features and that it encompasses all features described or shown or both, individually and in various combinations. Elements expressed in the claims should be construed to cover corresponding structure disclosed in the specification and drawings and equivalents thereof insofar as the latter are not within prior art and usage.

I claim:

1. A tractor comprising a frame, a prime mover carried by said frame, at least one drivable wheel which engages under all operative conditions the underlying ground for exerting tractive forces thereon for causing the tractor to move over the ground, said drivable wheel having an axle mounted on said frame which is connectable to said prime mover, at least one supporting element outboard of said wheel, link means connecting said supporting element to said frame whereby it is movable vertically relative to said wheel, said wheel and said supporting element each having axes of rotation and substantially equal radii from their respective said axes to their corresponding peripheries, gripping extensions extending outwardly from the periphery of said supporting element which increase the gripping engaging thereof with the ground to greater than that of said wheel, and coupling means for drivingly connecting said supporting element to said wheel, first parts of said coupling means mounted on said supporting element a first distance away from its said axis and second parts of said coupling means mounted on said wheel a second distance away from its said axis, said first and second distances being substantially equal, said first and second parts of said coupling means being respectively movable together relative to each other in a direction substantially parallel to said axis of rotation of said wheel for drivingly connecting said supporting element and said drivable wheel, said axes of rotation coinciding when said supporting element and said wheel are so drivingly connected, said first parts being movable axially relative to said supporting element, high pressure fluid communicating into said coupling means actuatable by the tractor's driver for causing said axial movement of said first parts whereby said parts of coupling means may be selectively either rigidly connected or entirely disconnected and spaced apart without any intervening connection between said wheel and said supporting element.

2. A tractor as claimed in claim 1, wherein said supporting element comprises supporting wheel members and an endless chain tread mounted on said supporting wheel members.

3. A tractor as claimed in claim 1, wherein said supporting element comprises an auxiliary wheel member.

4. A tractor as claimed in claim 1, wherein said coupling means includes means for transmitting driving torque from said wheel to said coupling means.

5. A tractor as claimed in claim 4, wherein said torque transmitting means comprises said first and second parts, said second parts comprising a part defining at least one aperture and said first parts comprising at least one extension provided on said wheel for engagement with the corresponding said aperture, said part defining said aperture being movable axially relative to said supporting element.

6. A tractor as claimed in claim 1, wherein a hydraulic cylinder is provided which is connected to said fluid, said first coupling parts on said supporting element being connected to be moved by said hydraulic cylinder.

7. A tractor as claimed in claim 6, wherein said supporting element includes a supporting wheel member, said hydraulic cylinder being coaxial with the centerline of said supporting wheel member.

8. A tractor as claimed in claim 7, wherein said hydraulic cylinder is secured for rotation with said supporting wheel member.

9. A tractor as claimed in claim 8, wherein said coupling means is directly connected with a piston rod of the hydraulic cylinder.

10. A tractor as claimed in claim 9, wherein a guide member is provided on said wheel member, said coupling means being connected with said guide member, said coupling means being displaceable axially of said supporting element along said guide member.

11. A tractor as claimed in claim 10, wherein said guide member is provided with axial keyways.

12. A tractor as claimed in claim 11, wherein said guide member is located at least partly within a rotatable hub portion included in said supporting wheel member of the supporting element.

13. A tractor as claimed in claim 12, wherein said rotatable hub portion is disposed within a nonrotatable hub portion included in said supporting wheel member.

14. A tractor as claimed in claim 1, wherein said link means comprises an elevating device which is provided between said frame and said supporting element for raising and lowering said supporting means relative to said wheels.

15. A tractor as claimed in claim 14, wherein each said elevating device is arranged between drivable wheels mounted on the tractor located whereby one said wheel is behind the other.

16. A tractor as claimed in claim 14, wherein two supporting elements are provided, said link means comprising hydraulic cylinders, each said supporting element having a respective elevating device including the first mentioned elevating device, said elevating devices being separately actuatable by means of respective said hydraulic cylinders which are interconnected to said frame.

17. A tractor as claimed in claim 14, wherein said elevating device is located inboard of the vertical inner boundary surfaces of said wheel.

18. A tractor as claimed in claim 17, wherein a portion of said elevating device is located between two wheels including the first mentioned wheel, said wheels being disposed in tandem on one side of the tractor.

19. A tractor as claimed in claim 18, wherein said supporting element has a length, measured in the direction of travel, substantially equal to the overall length of said two wheels located on one side of the tractor, said supporting element covering said wheels as seen from the side wherein said wheels are located.

20. A tractor as claimed in claim 1, wherein said supporting element is located on the outboard side of said drivable wheel and is substantially parallel thereto in all positions.

21. A tractor as claimed in claim 20, wherein said supporting element is bodily movable by said link means with respect to said frame whereby it is maintained in in its substantially parallel relationship.

22. A tractor as claimed in claim 21, wherein said link means comprises an elevating device which connects said supporting element to said frame, said elevating device comprising a parallelogram linkage having pivotal axes which extend substantially parallel to the intended direction of travel of the tractor.

23. A tractor as claimed in claim 22, including drive means for said wheel, a housing connected to said frame accommodating said drive means, said elevating device being mounted on said housing.

24. A tractor as claimed in claim 23, wherein said housing is one of two similar housings, said housing being connected on each side of said frame, said two housings each freely pivotable relatively to said frame about a connecting pivotal shaft.

25. A tractor as claimed in claim 24, wherein each said housing is freely pivotable with respect to said frame and with respect to the other said housing.

26. A tractor as claimed in claim 1, wherein said supporting element is drivable by contact with the ground.

27. A tractor as claimed in claim 1, wherein said wheel and a further wheel intercoupled therewith are located on one side of the tractor and are connected to be driven by a hydraulic motor included in said prime mover, each of the two wheels being drivably connectable to a respective supporting wheel member included in said supporting element.

28. A tractor as claimed in claim 27, wherein said hydraulic motor drives directly only one of the two said wheels located on one side of the tractor.

29. A tractor as claimed in claim 28, wherein said directly driven wheel drives one of said supporting wheel members which drives the other said supporting wheel member through an endless chain tread included in said supporting element, said other supporting wheel member driving the other of the two said wheels.

30. A tractor comprising: a frame; a prime mover supported thereby; ground engaging rotatable means mounted on said frame which is powered by said prime mover; a drivable supporting element; said rotatable means and said supporting element each having an axis of rotation and substantially equal radii relative to their respective axes to their respective peripheries, at least one subframe carrying said supporting element, said subframe being pivotally connected to said frame on one side of said tractor and adapted to place said supporting element in a position for exerting tractive forces which is outboard of said rotatable means, said supporting element being laterally movable by said subframe in a direction towards said rotatable means; and coupling means providing a driving connection between said supporting element and said rotatable means, at least part of said coupling means being movable by said subframe substantially parallel to the axis of rotation of said rotatable means, a further part of said coupling means included on said rotatable means and adapted to couple and uncouple with said first mentioned part of said coupling means as said supporting element is moved by said subframe respectively towards and away from said rotatable means; said axes of rotation coinciding, said coupling means spaced substantially radially outwardly from said axes, and said rotatable means and said supporting element engaging the ground in a side-by-side relationship when said parts of said coupling means are in operating engagement.

31. A tractor as claimed in claim 30, wherein said supporting element is one of two similar supporting elements which are each interconnected to said frame whereby they are disposed one on each side of the tractor, said two supporting elements being pivotable with respect to said frame about axes provided to extend substantially in the intended direction of travel of the tractor.

32. A tractor as claimed in claim 31, wherein said rotatable means comprises a drivable wheel mounted on one side of said frame, a further like drivable wheel mounted on the other side of said frame, each said drivable wheel operatively connected to said prime mover, each said supporting element comprising an antiskid device which can be selectively placed in an operative condition wherein it is coupled with its corresponding said drivable wheel.

33. A tractor as claimed in claim 32, wherein each said supporting element is disposed at one side of its corresponding said drivable wheel, each said supporting element being drivable by said corresponding drivable wheel and being fastened to said frame for displacement in a lateral and upward direction with respect to its corresponding said drivable wheel.

34. A tractor as claimed in claim 32, wherein said coupling means comprises a coupling member which is pivotably arranged on each side of said frame for pivoting each said supporting element when coupling each said supporting element with each said drivable wheel.

35. A tractor as claimed in claim 34, wherein a driver's seat is provided on the tractor and means are provided for actuating each said coupling means from said driver's seat.

36. A tractor as claimed in claim 1, wherein two supporting elements including the aforesaid supporting element are each interconnected to said frame whereby one is on each side of the tractor and each is pivotable about shafts interconnected to said frame which extend substantially in the intended direction of travel of the tractor.

37. A tractor as claimed in claim 30, including a driver's seat and control means within reach of said driver's seat, wherein said supporting element can be directly coupled with said rotatable means by said control means actuated from said driver's seat, said rotatable means comprising a drivable wheel.

38. A tractor as claimed in claim 30, wherein said supporting element is connected by at least two arms to said frame.

39. A tractor as claimed in claim 38, wherein each of said arms is pivoted both to said supporting element and to said frame, the pivotal axes of the two said arms being located at the corners of a parallelogram.

40. A tractor comprising a frame, a prime mover connected to said frame, at least one drivable ground engaging wheel mounted on each side of said frame each of which is operatively connected to said prime mover, a pair of rotatable supporting elements mounted from said frame whereby one of said supporting elements is disposed laterally adjacent and outboard one of said ground engaging drivable wheels on each side of said frame, displacing means for displacing each said supporting element both outwardly and upwardly relative to the corresponding adjacent said drivable wheel, each said supporting element being mounted on said frame via said displacing means, each said supporting element comprising a pair of wheel members, said wheels and said wheel members having substantially the same diameters, an endless track laying type chain tread received around said wheel members, and coupling means for selectively operatively connecting at least one of said wheel members of each said supporting element to the corresponding laterally adjacent said ground engaging drivable wheel whereby the periphery of said wheel and said tread around the adjacent said wheel member are in a side-by-side ground engaging relationship, said one wheel member and said corresponding adjacent wheel being selectively operatively connected by said coupling means at a location radially spaced substantially away from the axes of rotation of said one wheel member and said corresponding adjacent wheel.

41. A vehicle having a driver's seat, a frame, at least one ground engaging wheel mounted from said frame which is driven by said motor, linkage means, a rotary supporting member carried by said frame outboard of said wheel by said linkage means whereby it is movable by said linkage means from a position relatively higher than said wheel wherein said rotary supporting member is spaced above the underlying ground to a position wherein the axes of rotation of said wheel and said rotary supporting member substantially coincide and said wheel and said rotary supporting member engage the underlying ground in a side-by-side relationship, said wheel and said rotary supporting member having substantially equal radii from their respective axes of rotation to their respective peripheries, movable coupling means for establishing a selective driving connection between said wheel and said rotary supporting member, and control means within reach of said driver's seat for actuating said coupling means.

42. A vehicle in accordance with claim 41, wherein said coupling means comprises a coupling member which is connectable between said wheel and said rotary supporting member at a location spaced from said axes and wherein said rotary supporting member is adapted to be driven by said motor via at least in part said coupling member.

43. A vehicle in accordance with claim 42 wherein said coupling member comprises coupling parts, said wheel and said rotary supporting member each being provided with said coupling parts which are adapted to be engaged when said axes substantially coincide whereby said rotary supporting member and said wheel are operatively driven together by said motor.

44. A vehicle having a motor, a frame, at least one ground engaging wheel mounted from said frame which is drivable by said motor, linkage means, a rotary supporting member carried by said frame outboard of said wheel by said linkage means whereby it is movable by said linkage means from a position relatively higher than said wheel wherein said rotary supporting member is spaced above the underlying ground to a position wherein the axes of rotation of said wheel and said rotary supporting member substantially coincide and said wheel and said rotary supporting member engage the underlying ground in a side-by-side relationship, said wheel and said rotary supporting member having substantially equal radii from their respective axes of rotation to their peripheries, a hub in said rotary supporting member including a rotatable hub portion and a non-rotatable hub portion, a coupling member in said hub adapted to couple said wheel and said rotary supporting member when in said side-by-side relationship, said coupling member comprising a hydraulic cylinder in said rotatable hub portion which is coaxial with said axis of said rotary supporting member and defines first keyways, a coupling part directly connected with a piston received in said hydraulic cylinder, said piston including second keyways which cooperate with said first keyways to permit said piston's movement along said axis of said rotary supporting member, a guide member being provided on said wheel, said coupling part being connectable with said guide member when said wheel and said rotary supporting member are side-by-side relationship, said coupling part being displaceably axially relative to said rotary supporting member by movement of said piston in said hydraulic cylinder, said guide member being located at least partly within said coupling parts when said wheel and said rotary supporting member are coupled together and spaced therefrom when said wheel and said rotary supporting member are not so coupled.

45. A vehicle having a motor, a frame, at least one ground engaging wheel mounted on said frame which is driven by said motor, linkage means extending from said frame, a rotary supporting member carried by said frame outboard of said wheel by said linkage means whereby it is movable by said linkage means from a position relatively higher than said wheel wherein said rotary supporting member is spaced above the underlying ground to a position wherein the axes of rotation of said wheel and said rotary supporting member substantially coincide and said wheel and said rotary supporting member engage the underlying ground in a side-by-side relationship, said wheel and said rotary supporting member having substantially equal radii from their respective axes to their respective peripheries, said wheel being mounted on a first swing frame and said rotary supporting member being mounted on a second swing frame included in said linkage, a further wheel being mounted on said first swing frame and a further rotary supporting member being mounted on said second swing frame whereby the distance between the axes of rotation of said wheels is substantially equal to the distance between the axes of rotation of said rotary supporting members, an endless track being carried around said rotary supporting members.

46. A vehicle having a motor, a frame, at least one ground engaging wheel mounted from said frame which is driven by said motor, linkage means, a rotary supporting member carried by said frame outboard of said wheel by said linkage means whereby it is movable by said linkage means from a position relatively higher than said wheel wherein said rotary supporting member is spaced above the underlying ground to a position wherein the axes of rotation of said wheel and said rotary supporting member substantially coincide and said wheel and said rotary supporting member engage the underlying ground in a side-by-side relationship, said wheel and said rotary supporting member having substantial equal radii from their axes of rotation to their respective peripheries, stop means included in said linkage means for limiting the downward movement of said rotary supporting member to said position wherein the axes of rotation of said wheel and said rotary supporting member substantially coincide, hub means in said rotary supporting member, said linkage means comprising a support which rotatably supports said hub means, said hub means comprising coupling means which is disposed coaxially around the axis of rotation of said rotary supporting member and movable relative to said hub means towards said wheel to engage a coupling member, said coupling member being rigidly connected to said wheel for establishing a driving connection between said wheel and said rotary supporting member.

47. A vehicle in accordance with claim 46, wherein said wheel is mounted on a first swing frame and said rotary supporting member is mounted on a second swing frame included in said linkage, a further wheel being mounted on said first swing frame and a further rotary supporting member being mounted on said second swing frame whereby the distance between the axes of rotation of said wheels is substantially the same as the distance between the axes of rotation of said rotary supporting members, an endless track laying tread being carried around said rotary supporting members.

48. A tractor as claimed in claim 46, wherein a driver's seat is provided on the tractor and means are provided for actuating said coupling means from said driver's seat.

49. A tractor in accordance with claim 46, wherein said linkage means includes two arms, each of said arms being pivoted both to said frame and said rotary supporting member, the pivotal axes of the two said arms being located in the corners of a parallelogram.

* * * * *